United States Patent
Pai et al.

(10) Patent No.: US 12,235,826 B2
(45) Date of Patent: Feb. 25, 2025

(54) SYSTEM AND SEMI-SUPERVISED METHODOLOGY FOR PERFORMING MACHINE DRIVEN ANALYSIS AND DETERMINATION OF INTEGRITY DUE DILIGENCE RISK ASSOCIATED WITH THIRD PARTY ENTITIES AND ASSOCIATED INDIVIDUALS AND STAKEHOLDERS

(71) Applicant: KPMG LLP, New York, NY (US)

(72) Inventors: Pradeep Pai, Fort Lee, NJ (US); Bimal Sahay, Secaucus, NJ (US); Anu Sandhu, Chatham, NJ (US); Jorge Blanco, Clinton, NJ (US)

(73) Assignee: KPMG LLP, New York, NY (US)

( * ) Notice: Subject to any disclaimer, the term of this patent is extended or adjusted under 35 U.S.C. 154(b) by 259 days.

(21) Appl. No.: 16/934,698

(22) Filed: Jul. 21, 2020

(65) Prior Publication Data

US 2021/0026835 A1    Jan. 28, 2021

Related U.S. Application Data

(60) Provisional application No. 62/877,166, filed on Jul. 22, 2019.

(51) Int. Cl.
| | | |
|---|---|---|
| G06F 16/23 | (2019.01) | |
| G06F 16/215 | (2019.01) | |
| G06F 16/28 | (2019.01) | |
| G06F 40/169 | (2020.01) | |
| G06F 40/295 | (2020.01) | |
| G06F 40/30 | (2020.01) | |
| G06N 5/04 | (2023.01) | |
| G06N 20/00 | (2019.01) | |
| G06Q 10/0635 | (2023.01) | |
| G06Q 50/18 | (2012.01) | |
| G06Q 30/018 | (2023.01) | |

(52) U.S. Cl.
CPC ........ *G06F 16/2365* (2019.01); *G06F 16/215* (2019.01); *G06F 16/285* (2019.01); *G06F 40/169* (2020.01); *G06F 40/295* (2020.01); *G06F 40/30* (2020.01); *G06N 5/04* (2013.01); *G06N 20/00* (2019.01); *G06Q 10/0635* (2013.01); *G06Q 50/18* (2013.01); *G06Q 30/018* (2013.01)

(58) Field of Classification Search
CPC .. G06F 16/2365; G06F 16/285; G06F 16/215; G06F 40/169; G06F 40/295; G06F 40/30; G06N 20/00; G06N 5/04; G06Q 10/0635; G06Q 50/18
See application file for complete search history.

(56) References Cited

U.S. PATENT DOCUMENTS

| | | | |
|---|---|---|---|
| 10,339,484 B2 | 7/2019 | Pai et al. | |
| 10,592,838 B2 | 3/2020 | Urban et al. | |
| 2006/0074793 A1* | 4/2006 | Hibbert | G06Q 40/00 |
| | | | 705/38 |

(Continued)

*Primary Examiner* — Courtney Harmon
(74) *Attorney, Agent, or Firm* — Hunton Andrews Kurth LLP

(57) ABSTRACT

Systems and methods for performing machine-driven analysis and determination of integrity due diligence risk associated with third-party entities and individuals associated with third-party entities are disclosed.

23 Claims, 22 Drawing Sheets

(56) References Cited

U.S. PATENT DOCUMENTS

| | | | |
|---|---|---|---|
| 2011/0178836 A1* | 7/2011 | Seefeld | G06Q 30/02 705/7.28 |
| 2012/0221485 A1* | 8/2012 | Leidner | G06Q 40/08 705/36 R |
| 2012/0316916 A1* | 12/2012 | Andrews | G06Q 50/01 705/7.29 |
| 2014/0258032 A1* | 9/2014 | Psota | G06Q 30/0609 705/26.35 |
| 2016/0134654 A1* | 5/2016 | Ghent | G06F 16/9024 707/800 |
| 2018/0027006 A1* | 1/2018 | Zimmermann | G06F 21/6218 726/11 |
| 2018/0285886 A1* | 10/2018 | Yan | G06Q 30/018 |
| 2019/0303395 A1* | 10/2019 | Flood | G06F 40/295 |
| 2020/0364298 A1* | 11/2020 | Kohita | G06F 40/284 |
| 2020/0410321 A1* | 12/2020 | Kumar | G06N 3/049 |
| 2021/0117417 A1* | 4/2021 | Hendrickson | G06F 16/90 |

* cited by examiner

SYSTEM AND SEMI-SUPERVISED METHODOLOGY FOR PERFORMING MACHINE DRIVEN ANALYSIS AND DETERMINATION OF INTEGRITY DUE DILIGENCE RISK ASSOCIATED WITH THIRD PARTY ENTITIES AND ASSOCIATED INDIVIDUALS AND STAKEHOLDERS

CROSS REFERENCE TO RELATED APPLICATIONS

The application claims priority to U.S. Provisional Application 62/877,166, filed Jul. 22, 2019, the contents of which are incorporated herein in its entirety.

FIELD OF THE INVENTION

The present invention relates generally to a system and method for performing machine driven analysis and determination of integrity due diligence risk associated with third party entities and associated individuals and stakeholders.

BACKGROUND

Integrity due diligence was traditionally performed by a combination of technology and experts, requiring several days of effort and relatively high costs in conducting due diligence risk assessments. As a result, companies were not able to subject a majority of their third parties to risk assessments. A "third party" may be any external entity that provides a product or service to a company or on behalf of a company to its customers. Examples of third parties may include but are not limited to suppliers, alliances, vendors, joint ventures, contingent workforce providers, etc. Based on market feedback, there is a need for more automated and timely analysis and determination of integrity due diligence risks associated with third-party entities and individuals and stakeholders associated with third-party entities.

SUMMARY

Systems and methods for performing semi-supervised machine-driven analysis and determination of integrity due diligence risks associated with third-party entities and individuals and stakeholders associated with third-party entities are disclosed.

According to an embodiment of the present invention, a system is directed to determining due diligence risks. The system comprises: a memory for storing and managing data; an user interface that electronically receives user input; and a processor coupled to the memory and the user interface, the processor configured to determine an integrity due diligence risk associated with a third-party entity and further configured to perform the steps: extracting data from a plurality of data sources to form an article corpus; performing a de-duplication of each article from the article corpus based on a similarity index, wherein the de-duplication process is based on exact title, similar title and similar content; extracting one or more relevant texts from the article corpus using an recognition tool that applies weights and a plurality of filters comprising an organization filter, negative vocabulary filter and character count filter; clustering a set of articles corresponding to an event to identify similar articles; performing a classification of sentences to determine sentiment; generating a risk event, wherein the risk event comprises one or more of: litigation, sanctions, adverse media, background and key individuals; calculating a risk score for each risk event; and based on the risk score, generating, via the user interface, an output wherein the output comprises a graphic that illustrates each risk event and supporting articles with one or more annotations generated via machine learning algorithm that identifies negative content.

According to an embodiment of the present invention, a method is directed to determining due diligence risks. The method comprises the steps of: extracting data from a plurality of data sources to form an article corpus; performing a de-duplication of each article from the article corpus based on a similarity index, wherein the de-duplication process is based on exact title, similar title and similar content; extracting one or more relevant texts from the article corpus using an recognition tool that applies weights and a plurality of filters comprising an organization filter, negative vocabulary filter and character count filter; clustering a set of articles corresponding to an event to identify similar articles; performing a classification of sentences to determine sentiment; generating a risk event, wherein the risk event comprises one or more of: litigation, sanctions, adverse media, background and key individuals; calculating a risk score for each risk event; and based on the risk score, generating, via a user interface, an output wherein the output comprises a graphic that illustrates each risk event and supporting articles with one or more annotations generated via machine learning algorithm that identifies negative content.

According to disclosed embodiments, low-cost, machine-driven solutions that allow companies to assess integrity due diligence risks associated with third-party entities at a large scale and fast speed are disclosed. These low-cost machine-driven solutions are capable of performing a quick screening of due diligence risks, and in addition, providing automated identification of due diligence risks based on the codification of deep forensics expertise in content sourcing and risk analysis in various geographic regions around the world. These solutions allow for leveraging of this expertise to perform semi-supervised training of risk detection analytics models in accordance with disclosed embodiments. Furthermore, quantification of identified risks into an actionable score using a configurable risk scorecard that is unique to the market may be achieved according to disclosed embodiments.

Systems and methods according to disclosed embodiments allow companies to rapidly assess the due diligence risks associated with third-party entities and individuals associated with third-party entities, thus providing companies with mechanisms to implement a risk-based compliance program for third-party risk management.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention recognizes that there is a need to calculate adverse media risk for a third party based on detection of and scoring any negative sentiment from various news feed articles. This may involve identification of negative events, such as risk events, from analyses of these news articles. For example, an embodiment of the present invention may apply a calculation of a relevant risk score for the third party. This may involve clustering together news articles representing the same event such that only one risk event may be flagged from each such cluster. Risk may also relate to assessments of litigation risks associated with third-party entities.

Figure 1:
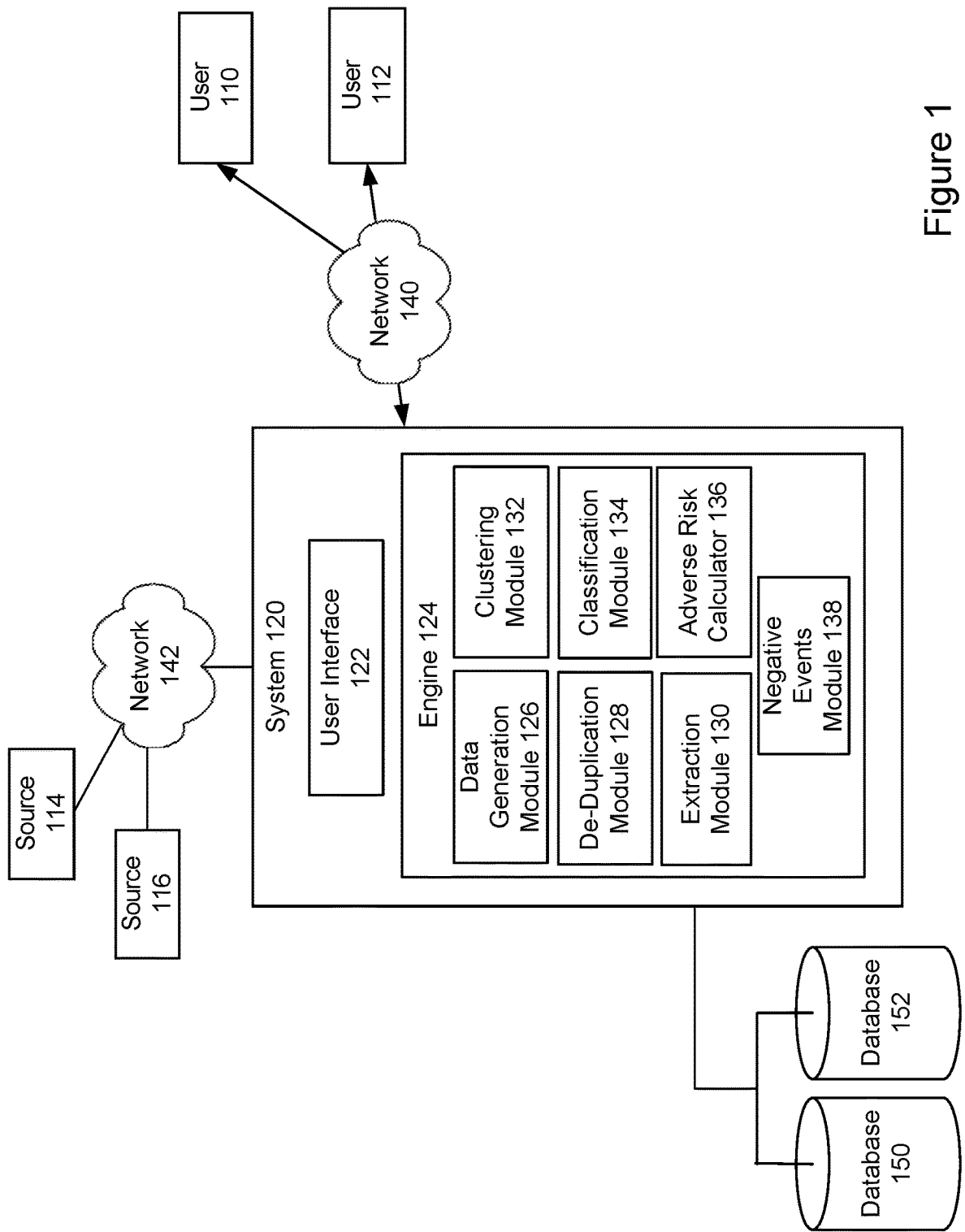
FIG. 1 is an exemplary system diagram, according to an embodiment of the present invention.

FIG. 1 is an exemplary system diagram, according to an embodiment of the present invention. As shown in FIG. 1, users 110, 112, may access System 120 via a Network 140. Users 110, 112 may access System 120 via a User Interface 122. Users 110, 112 may communicate with System 120 using a mobile or computing device, such as a laptop computer, a mobile device or other computing devices capable of sending or receiving network signals.

System 110 may include Engine 124 which may provide various functions and services via modules, such as Data Generation Module 126, De-Duplication Module 128, Extraction Module 130, Clustering Module 132, Classification Module 134, Adverse Risk Calculator 136 and Negative Events Module 138. Other services and functions may be provided. System 110 may receive data from various sources represented by Source 114, 116. The data collected and processed may be stored and managed in various Database represented by Database 150, 152.

The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
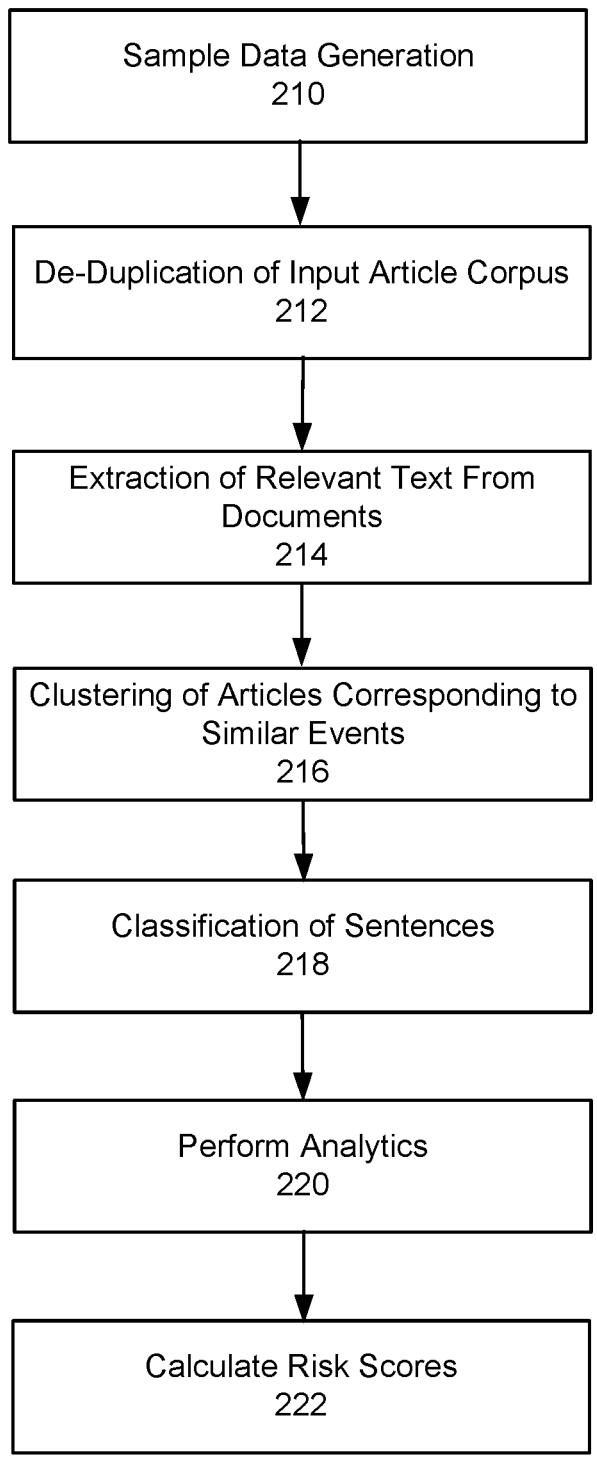
FIG. 2 is an exemplary flow diagram, according to an embodiment of the present invention.

FIG. 2 is an exemplary flow diagram, according to an embodiment of the present invention. At step 210, sample data may be generated. This may involve extraction and normalization of the data. Step 212 may apply a de-duplication of input article corpus. Step 214 may extract relevant data or text from each document corresponding to a target entity.

Step 216 may apply a clustering of articles corresponding to similar events. For example, documents may be clustered for adverse media risk assessment. This may involve creating a negative terms dictionary and applying filters to determine which articles are negative (e.g., clustering, fuzzy matching, etc.). For litigation risk assessment, clustering may involve identifying a set of court (or administrative) case documents that have an impact (positive or negative) for a given entity; identifying parties, types of parties, judgment, conclusion, and other data; and distinguishing recent cases from old cases.

Step 218 may perform classification and/or parsing which may involve classifying sentences from an article or other document. Step 220 may perform analytics on certain risk events. Analytics may include background analytics, sanctions analytics, etc. Step 222 may calculate risk scores. For example, risk scores may be based on entity relevance, section relevance and risk relevance. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 3:
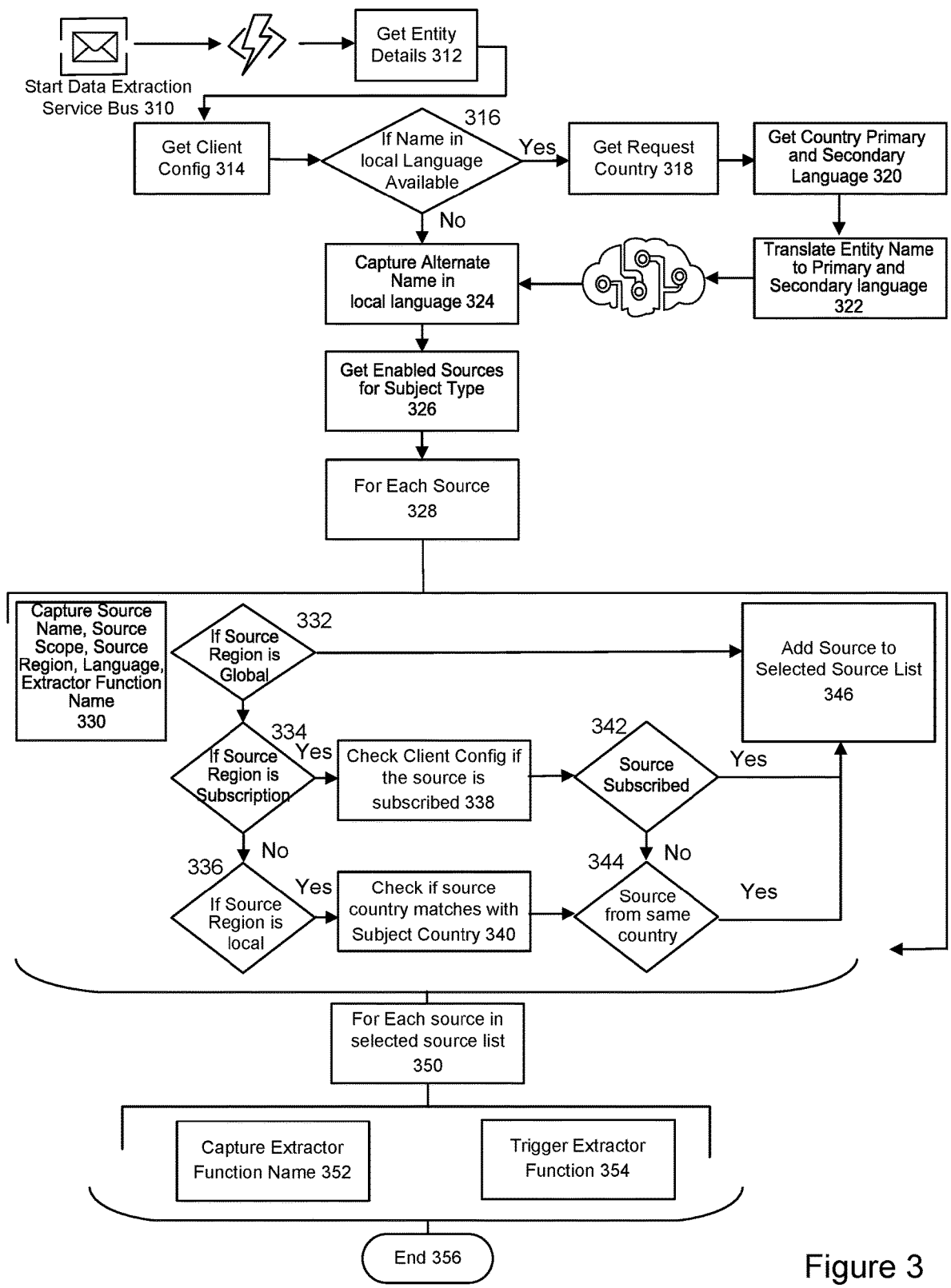
FIG. 3 is a flow diagram of a sample data and data extraction process, according to an embodiment of the present invention.

FIG. 3 is a flow diagram of a sample data and data extraction process, according to an embodiment of the present invention. Data extraction service bus may be initiated at step 310. At step 312, entity details may be retrieved. At step 314, client configuration data or files may be retrieved. At step 316, a determination may be made as to whether a name in a local language is available. If yes, a request country may be identified at step 318. At step 320, country primary and secondary language may be retrieved. Step 322 may translate an entity name to a primary and secondary language using a translation function, e.g., Azure Translation. At step 324, an alternate name in a local language may be captured. At step 326, enabled sources for subject type (e.g., entity, individual, both) may be retrieved.

For each source at 328, source processing steps may be applied. For example, various source information 330 may be captured, including source name, source scope, source region, language, extractor function name, etc. For example, extractor function name may represent the key to trigger a single extractor workflow.

A determination on the source region may be performed. For example, step 332 may determine whether source region is global; whether source region is subscription (step 334) and whether source region is local (step 336). If the source region is subscription, step 338 may check the client configuration to determine whether the source is subscribed. If the source is subscribed (at step 342), the source may be added at 346. If the source region is local, step 340 may determine whether the source country matches the subject country. If the source is from the same country (step 344), the source may be added to a selected source list at 346.

For each source in the selected source list, an extractor function name may be captured at 352. Extractor Function Name may represent the key to trigger single extractor workflow. Also, an extractor function may be triggered at 354. Each named extractor may correspond to a workflow that needs to be triggered. This workflow may predefine the extractor flow. According to an exemplary embodiment, this may be an API call, a web scrapping flow of the source or a pre scrapped indexed data. The process ends at 356.

Figure 4:
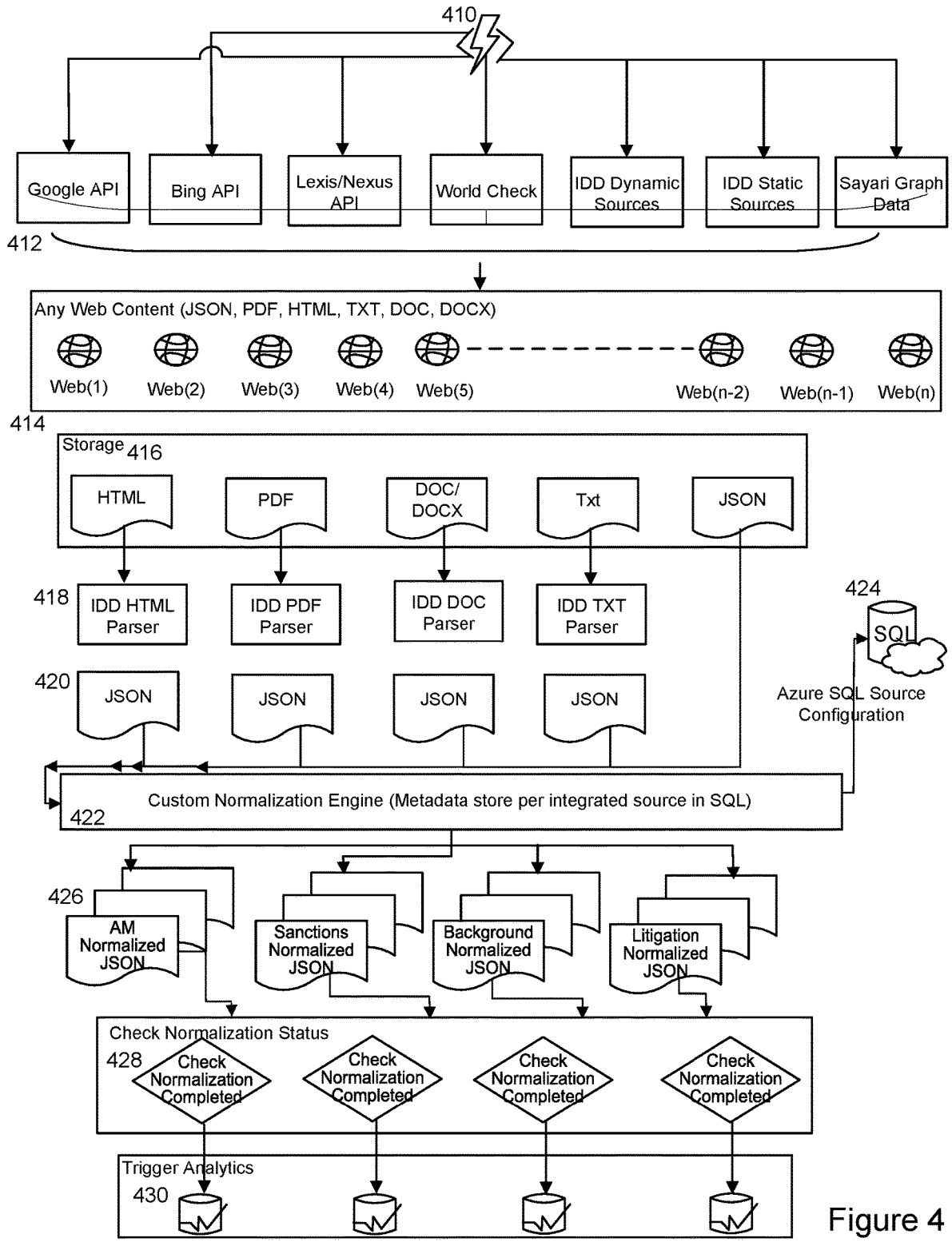
FIG. 4 is a flow diagram of an extraction and normalization process, according to an embodiment of the present invention.

FIG. 4 is a flow diagram of an extraction and normalization process, according to an embodiment of the present invention. As shown in FIG. 4, a data extraction function may trigger each extractor function based on a relevant source list. Sources 412 represents exemplary source lists. Web Content 414 represents web content in various formats from a plurality of websites. Storage 416 may include data storage components, including HTML, PDF, DOC/DOCX, Txt, JSON and others. Parser 418 may parse the stored data into a particular format, such as JSON, as shown by 420. The parsed data may be transmitted to a Custom Normalization Engine 422. Custom Normalized Engine 422 may be part of an Integrity Due Diligence solution that manages client third parties and determine risk profiles. For example, Engine 422 may include a metadata store per integrated source. The data may then be stored and managed in a SQL source configuration database 424. Normalized data is represented by 426, which may include various categories of data, including AM, Sanctions, Background data and litigation information. For example, raw data may be normalized to a common format. Normalization processing may be applied at 428. Upon completion, trigger analytics may be applied and stored at 430. For example, once the extraction process is complete, each analytics function may be triggered, which may include various analytics processes that relate to Backgroud, Sanctions, Litigation and Adverse Media analytics.

Figure 5:
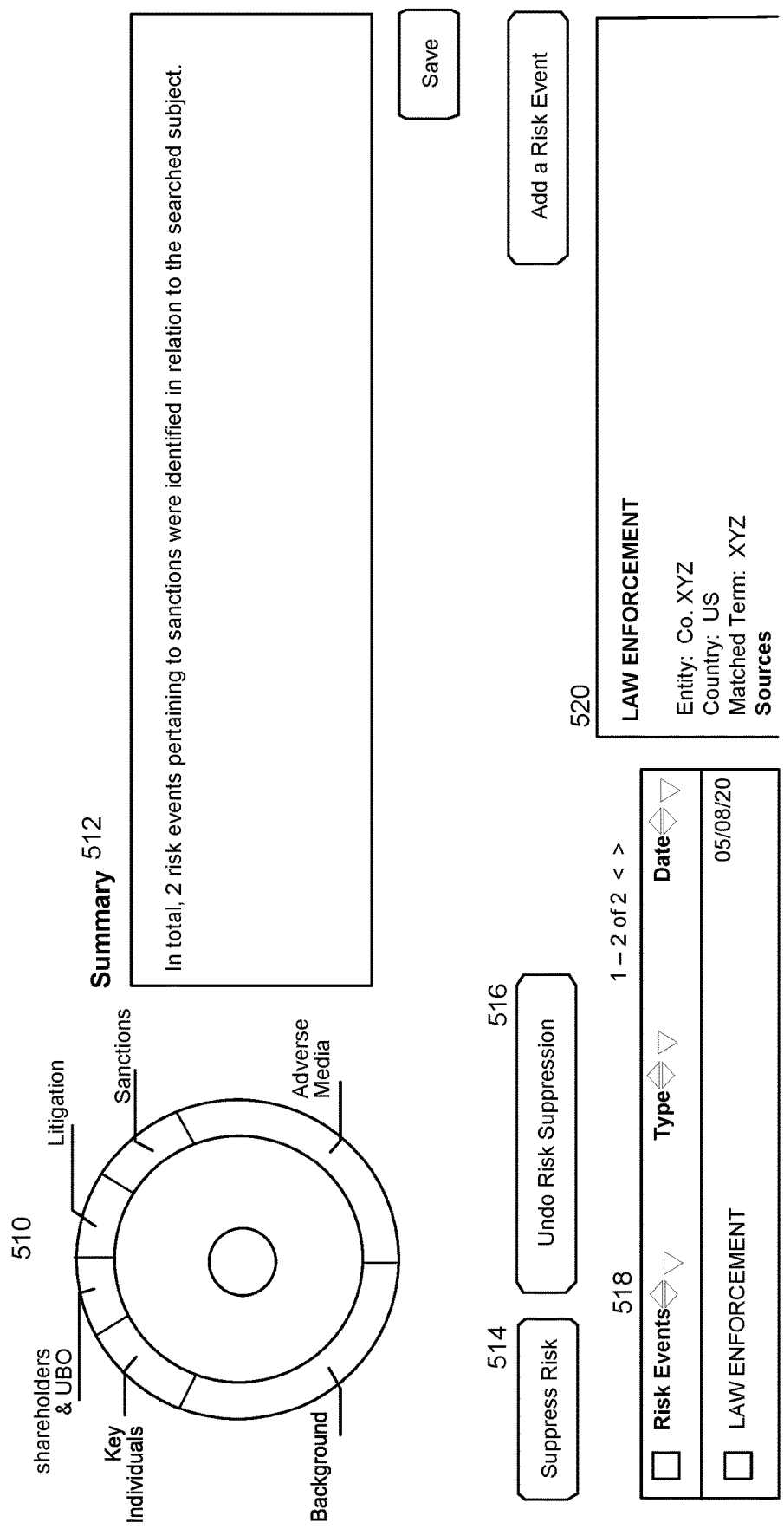
FIG. 5 is an exemplary user interface, according to an embodiment of the present invention.

FIG. 5 is an exemplary user interface, according to an embodiment of the present invention. FIG. 5 provides a graphical interface for a specific entity. In this example, graphic 510 illustrates a corresponding value of risk associated with various areas, such as Litigation, Sanctions, Adverse Media, Background, Key Individuals, and Shareholders and UBO (ultimate beneficial owner). A summary section at 512 may provide additional details concerning risk events.

User input may be provided at Suppress Risk at 514 and Undo Risk Suppression at 516. For example, the output of the analytics process may include various risk events associated with a section (e.g., Sanctions, Adverse Media, etc.). These risk events may be presented to users (e.g., clients, analytics, etc.) who may then determine based on use case or pre-defined process to suppress those risk events to be presented in a suppressed section of the report.

Risk events may be listed at 518 with corresponding details at 520. For example, a user may view additional details, such as a news article with the relevant text highlighted and/or annotated. The annotations and highlights may be presented in various forms (e.g., color, font, etc.) to indicate severity, importance and/or other characteristics.

Figure 6:
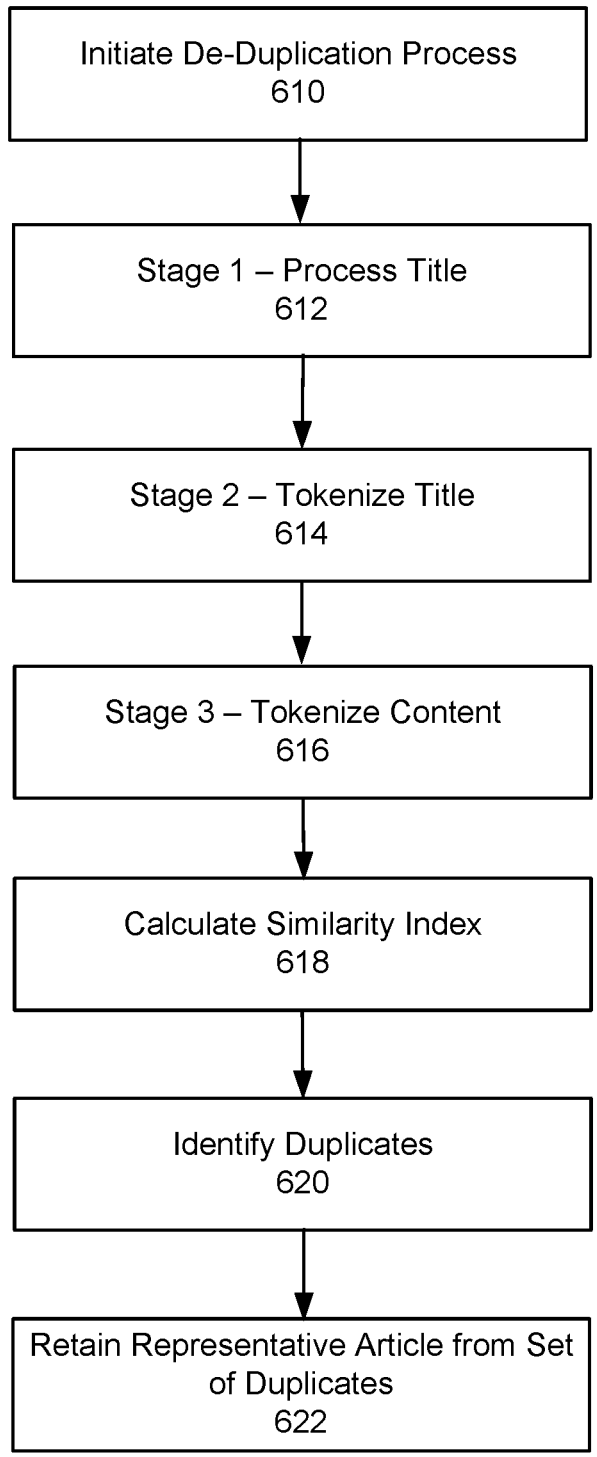
FIG. 6 is a flow diagram of a de-duplication process, according to an embodiment of the present invention.

FIG. 6 is a flow diagram of a de-duplication process, according to an embodiment of the present invention. For example, an embodiment of the present invention may remove duplicate articles from an articles corpus for a given entity (as identified by a request identifier or other identifier) when two or more articles have similarities. Such similarities may include same title, similar title and similar article content. Other parameters may be identified as well, e.g., date and time; source; length, etc.

For example, a data source may include an article corpus in a JSON format having at least "title" and "text" as two fields. Sample data for a few entities may be pulled from an environment. An embodiment of the present invention may include multiple stages.

At step 610, a de-duplication process may be initiated. At step 612, Stage 1 may involve processing a title. For example, processing a title may involve striping white space of the "title" column from both sides and then using a de-duplication method (e.g., Pandas) to remove the rows (articles) for which the title is the same.

At step 614, Stage 2 may involve tokenizing each title keeping tokens containing alphabets (e.g., words). Stage 2 may involve creating shingles (e.g., trigrams) from each title (e.g., words). For each pair of article titles, if the article date difference is less than or equal to 30 days (configurable parameter), then a similarity index or score may be calculated, as shown by step 618. The similarity index or score may be a similarity index (e.g., Jaccard similarity index) between the shingles of the title pairs. If the score is above 0.9 (configurable parameter), then the pair of articles may be marked as a duplicate, as shown by step 620. An embodiment of the present invention may then retain a representative article (e.g., the first article) from a set of duplicate articles in the corpus, as shown by step 622. Other similarity algorithms and methods may be applied; Jaccard is one example and the embodiments of the present invention are not limited.

At step 616, Stage 3 may involve tokenizing each article's content (e.g., text) and keeping the tokens containing alphabets (e.g., words). According to an example, Stage 3 may keep a set of words, such as the first 30 (configurable parameter) words. Stage 3 may involve creating shingles (trigrams) from each article's content (words). For each pair of article's content, if the article date difference is less than or equal to 30 days (configurable parameter), then a similarity index or score may be calculated, as shown by step 618. This may include a Jaccard similarity index (score) between the shingles of the article's content pairs. If the score is above 0.9 (configurable parameter), then the pair of articles may be marked as duplicate, as shown by step 620. An embodiment of the present invention may then retain a representative (e.g., the first article) from a set of duplicate articles in the corpus, as shown by step 622.

Figure 7:
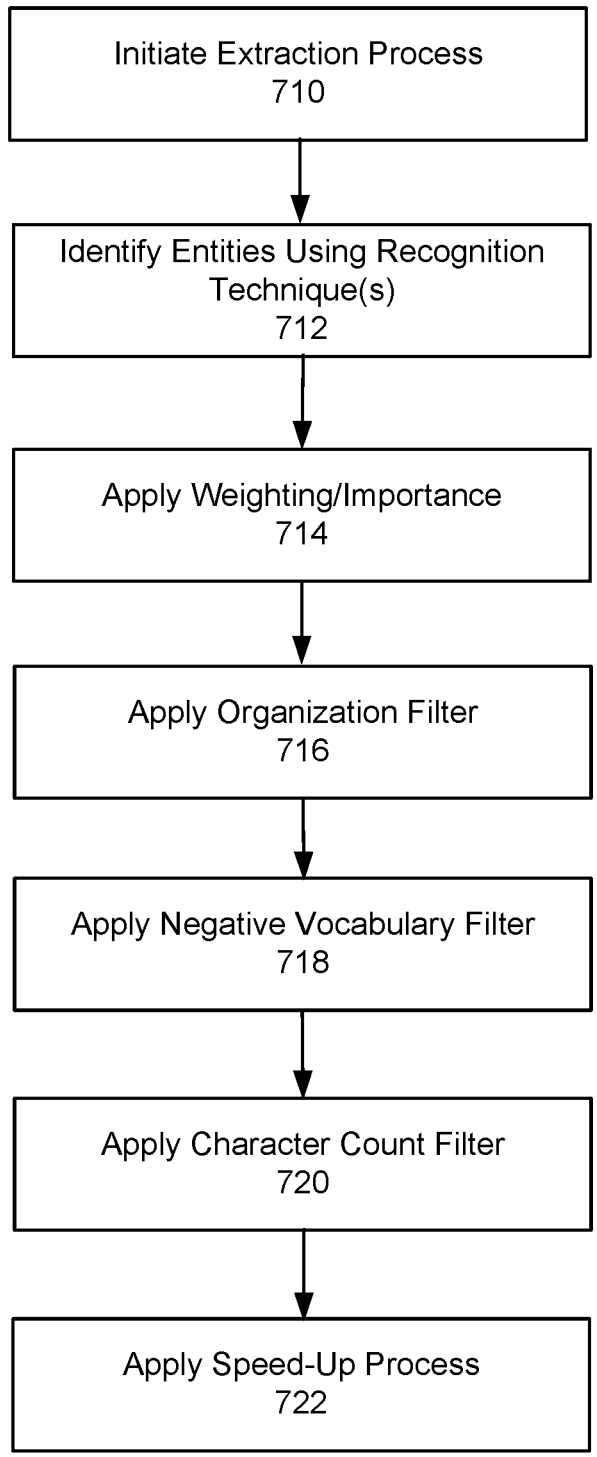
FIG. 7 is a flow diagram of an extraction process, according to an embodiment of the present invention.

FIG. 7 is a flow diagram of an extraction process, according to an embodiment of the present invention. For example, an embodiment of the present invention may extract relevant information from each document. This seeks to reduce false positives in the documents after prediction by filtering out unimportant articles.

At step 710, an extraction of relevant information process may be initiated. At step 712, entities in the article may be identified using Named Entity Recognition (NER) Techniques, where searched entity may be used to determine other entities or variations using advanced String matching algorithms (e.g., Jaro Winkler, Rosette Name Similarity, Fuzzy matching etc.). NER is one exemplary technique; other recognition algorithms and techniques may be applied.

At step 714, weighting or a level of importance may be applied. This step may identify entities and context of the article, giving high importance to the article which are relevant to the entity of interest as well as context of the articles is looked for desired type of information (Money Laundering, Corruption Cases, Financial Crime, etc.). For each article, certain components may be extracted, which may include named entities, location, date, etc. An article may then be scored by comparing a component, such as the named entity with the input subject using custom fuzzy logic to determine entity relevance. Predefined key words and phrases may be used with a proximity based search to determine the relevance of the entity to the risk event such as corruption, financial crime, etc.

An embodiment of the present invention may apply various filters to the input document. The filters may include an Organization Filter, a Negative Vocabulary Filter and a Character Count Filter.

At step 716, an Organization Filter may be applied. An embodiment of the present invention may recognize that the documents with most false positives were having only a passing reference to the organization under review. An embodiment of the present invention may apply an organization counter filter. For example, an organization name may be normalized against a set of keywords such as "Corporation," "LLC," "GmBH," etc. Hence, names like "ABC123 Corporation" may be converted to "ABC123." Next, Organization Filter may count the number of occurrences of the normalized entity. For example, a minimum number of occurrences of entity for a document to be considered may be 4. This number may vary depending on dataset size and other factors.

At step 718, a Negative Vocabulary Filter may be applied. An embodiment of the present invention may recognize that adverse media relates to catching negative sentiments. In this example, an embodiment of the present invention may be concerned with negative sentiments instead of positive ones. To effectively filter out documents without negative sense, an embodiment of the present invention may apply a negative litigious vocabulary list. For example, a minimum number of occurrences of negative vocabulary for a document to be considered may be 5. This number may vary depending on dataset size and other factors.

At step 720, a Character Count Filter may be applied. By exploring the variance and standard deviations of the number of characters obtained, an embodiment of the present invention may recognize that counts over two standard deviations away from the mean should be discarded. An embodiment of the present invention may recognize that records with very few characters were mere sentences coupled together (likely an HTML parsing error). And those with very high count (>50,000 characters) were some transcripts which have nothing to do with adverse news. In this example, an embodiment of the present invention may decide to discard documents with a character count of less than 300 and those with more than 6,000. Other limits and ranges may be applied.

At step 722, a Speed-Up process may be applied. An embodiment of the present invention may use a fast hashing based search that provides a significant speedup of over 100 times, for example.

An embodiment of the present invention may be directed to clustering of documents corresponding to similar events. Articles pertaining to same events may be clustered and considered as a single event. Advanced text clustering methods focused on density based spatial clustering of application with noise (e.g., DBSCAN) may be used to identify similar type of events within a given time frame.

For adverse media risk assessment, an embodiment of the present invention may be directed to creating and applying a negative terms dictionary. According to an embodiment of the present invention, an application may use a carefully curated negative term dictionary to quickly identify articles with relevant context and negative information. The dictionary may include curated for different risk segments, languages and jurisdiction/countries.

A feedback loop may be applied to further analyze created reports called golden reports. For example, golden reports may represent reports that have been curated by an analyst or other source. The process may include risk suppression, addition of more risk, change in language, change in citation and change in content. An embodiment of the present invention may use golden report data to generate weights for dictionary words. According to an exemplary embodiment, this may be performed through Counter Vectorizer, Borda Count and Weightage JSON technique. For example, golden report data may also be used to generate semantic relation between words and PERSON, ORGANIZATION, LOCATION, DATE, MONEY.

An embodiment of the present invention may be directed to applying filters to determine which articles are negative. This may involve identifying sentiment for each entity within the article using entity-based sentiment analysis. For example, an article which contains negative sentiment for a given entity may be further validated for negative events with respect to the given entity using customized dependency parsing techniques.

Adverse media articles identified for a given entity may be given an overall negative as well as a relevance score.

Figure 8:
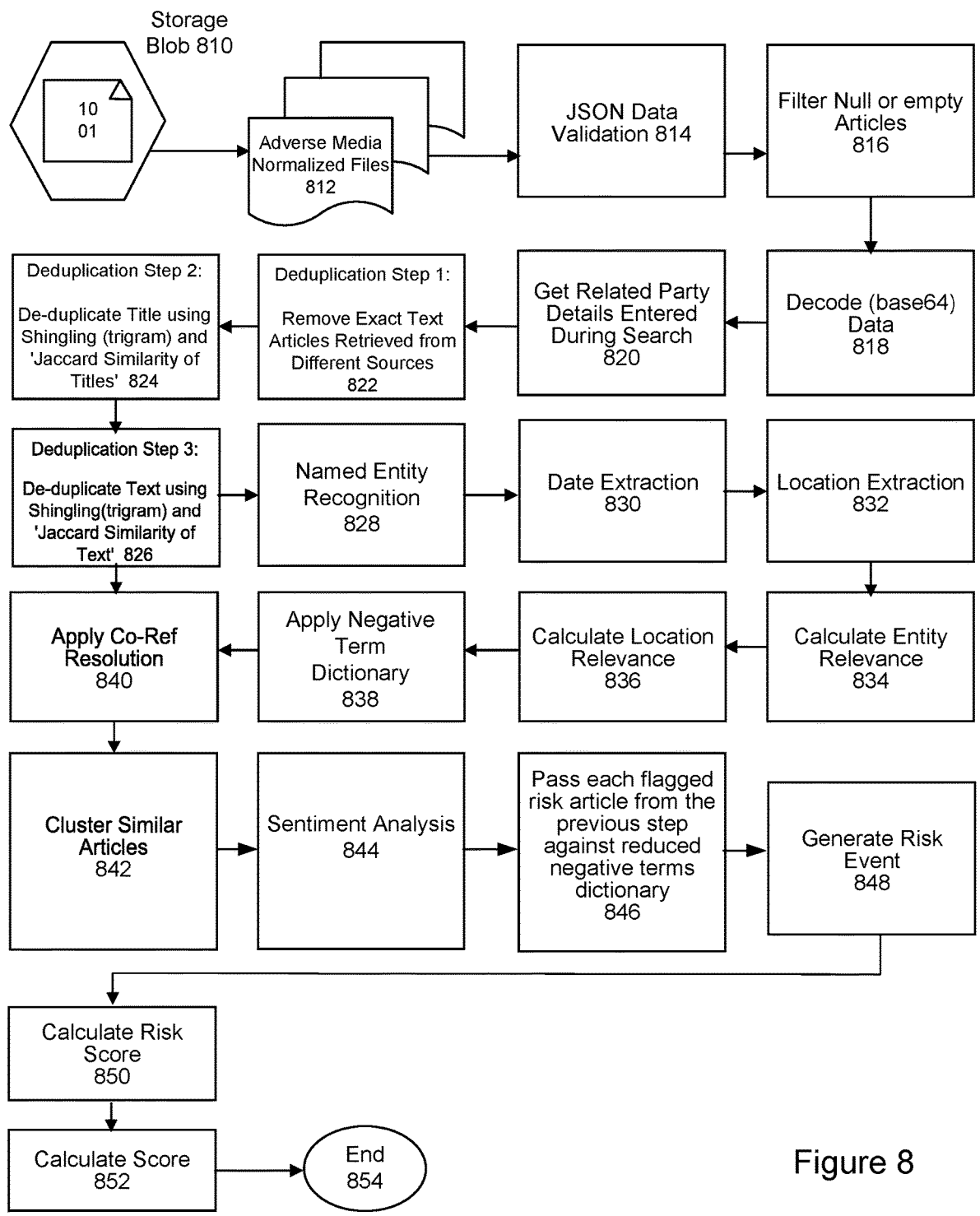
FIG. 8 is a flow diagram of an Adverse Media (AM) Analytics, according to an embodiment of the present invention.

FIG. 8 is a flow diagram of Adverse Media (AM) Analytics, according to an embodiment of the present invention. Data may be stored and managed as storage blobs, represented by 810. Other storage formats may be applied. Adverse media normalized files may be represented at 812. At step 814, data validation may be applied. This may include JSON data validation. At step 816, null or empty articles may be filtered. At step 818, data may be decoded. This may involve decoding base64 data. At step 820, related party details entered during a search or other user interaction may be retrieved. At step 822, Step 1 of a deduplication process may be initiated. This may involve removing exact text articles retrieved from different sources. At step 824, Step 2 of a deduplication process may be applied. This may involve de-duplicating title using shingling (trigram) and Jaccard similarity of titles. Shingling represents an exemplary feature engineering method used in natural language processing. At step 826, Step 3 of a deduplication process may be applied. This may involve de-duplicating text using shingling (trigram) and Jaccard similarity of text. At step 828, a named entity recognition may be performed. At step 830, date extraction may be applied. At step 832, location extraction may be performed. At step 834, entity relevance may be calculated. At step 836, location relevance may be calculated. At step 838, negative term dictionary may be applied. At step 840, co-reference resolution may be applied. Co-reference resolution may represent the task to find expressions that refer to the same entity. For example, a neural based technique may be implemented. At step 842, similar articles may be clustered. This may involve clustering similar articles using clustering algorithm (e.g., HDB-Scan, etc.). This may further include sorting articles by date (or other factor). If a difference (in dates) is greater than a predetermined time period (e.g., 30 days) for any article, an embodiment of the present invention may consider the article as noise and then send it to a separate cluster. At step 844, a sentiment analysis may be applied. For example, this may involve sending the article content to a cloud engine's sentiment analysis to determine negative context and retrieve negative sentences having a score less than a predetermined threshold (e.g., −0.2). At step 846, each flagged risk article from a previous step may be passed against a reduced negative terms dictionary. At step 848, a risk event may be generated. At step 850, risk score may be calculated. At step 852, a score may be calculated.

Scores may include a document level sentiment score and a cluster level sentiment score. For a document level sentiment score, an embodiment of the present invention may calculate an article relevant score by passing the respective article against the AM dictionary and then calculate a mean value. This step may involve getting the mean value of the Alias Sentiment score for the article and then applying a sigmoid on (article relevant score+Alias Sentiment score). For a cluster level sentiment score, an embodiment of the present invention may determine a maximum score of some or all the articles in the cluster. This may involve selecting the article having maximum negative score as the risk event from the respective cluster. An embodiment of the present invention may be directed to calculating an AM risk score for the target entity as a mean of all cluster sentiment score. This exemplary process ends at step 854.

Figure 9:
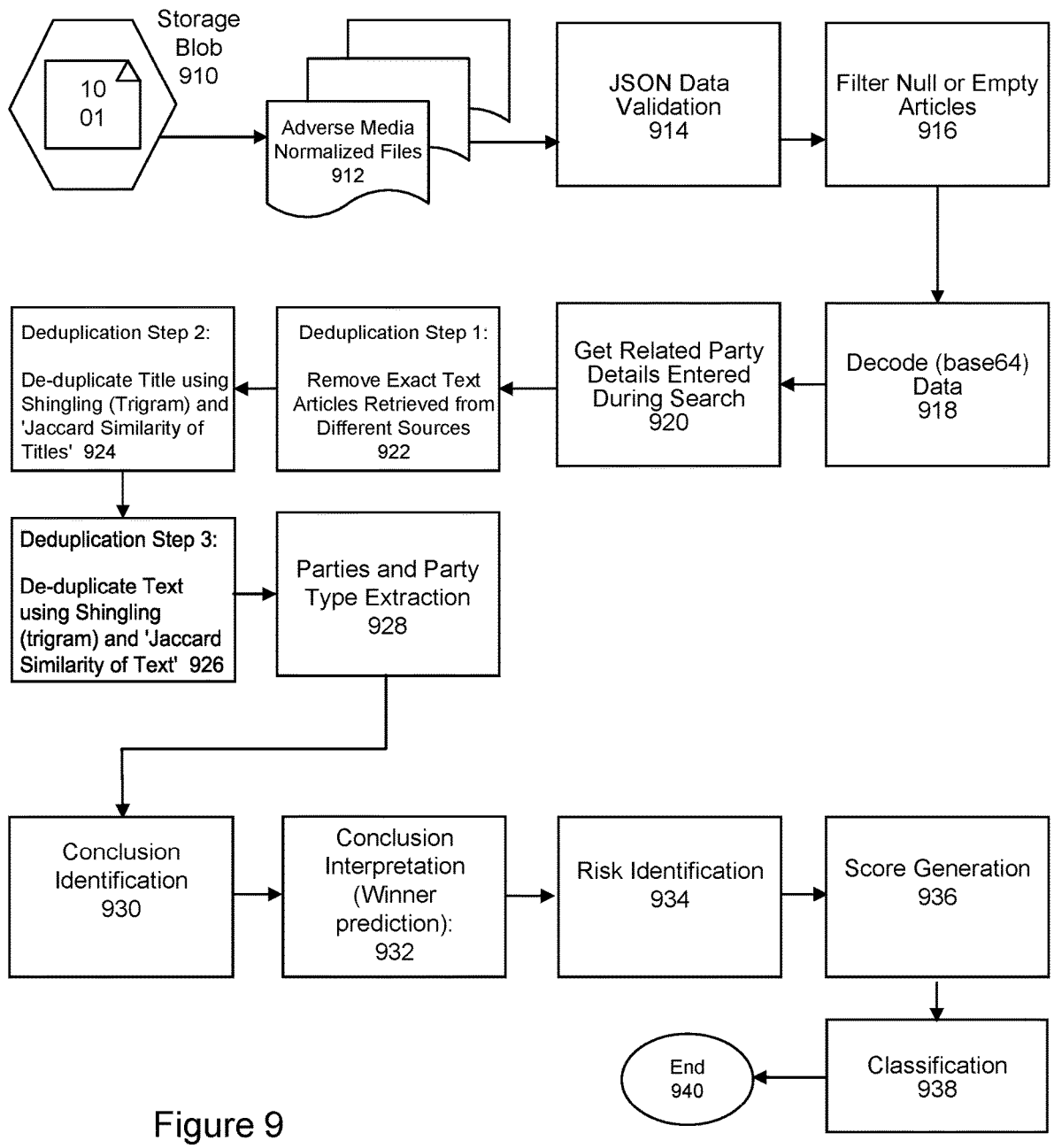
FIG. 9 is a flow diagram of litigation risk assessment, according to an embodiment of the present invention.

FIG. 9 is a flow diagram of litigation risk assessment, according to an embodiment of the present invention. Data may be stored and managed as storage blobs, represented by 910. Other storage formats may be applied. Adverse media normalized files may be represented at 912. At step 914, data validation may be applied. This may include JSON data validation. At step 916, null or empty articles may be filtered. At step 918, data may be decoded. This may involve decoding base64 data. At step 920, related party details entered during a search or other user interaction may be retrieved. At step 922, Step 1 of a deduplication process may be initiated. This may involve removing exact text articles retrieved from different sources. At step 924, Step 2 of a deduplication process may be applied. This may involve de-duplicating title using shingling (trigram) and Jaccard similarity of titles. At step 926, Step 3 of a deduplication process may be applied. This may involve de-duplicating text using shingling (trigram) and Jaccard similarity of text. At step 928, parties and party type extraction may be applied. This may be applied by regular expression and distance based algorithm.

After extraction, an embodiment of the present invention may compare a given entity name by extracted entity name. This comparison may be performed by fuzzy match with 80 as threshold value, for example. If a match is not found, an empty dictionary may be returned. When an entity is matched with more than fuzzy threshold score, an embodiment of the present invention may revalidate through name matching (Rosette name matching) for entity party mapping. For the extraction step, if the given entity is neither claimant nor defendant, then the article may be ignored.

At step 930, conclusion identification may applied. The conclusion identification may involve using pre-trained conclusion identifier model which includes finding a conclusion paragraph by regular expressions and sentence classification. If pre-trained conclusion identifier fails, then an embodiment of the present invention may take the last predetermined number (e.g., 10) sentences of the document as conclusion.

At step 932, conclusion interpretation may be initiated. This may be a winner prediction process. Conclusion interpretation may extract pairs of Nouns and Action Verbs from a summarized conclusion; and interpret a verdict from Noun-Verb pairs and return the results for as claimant won, claimant lost or Inconclusive. If a Noun-Verb pair is not found, an embodiment of the present invention may look for certain regular expressions for winner prediction.

At step 934, risk identification may be initiated. If a given entity comes out to be losing party of the case, then the given case may be marked as a risk. At step 936, score generation may be applied. The steps of FIG. 9 may be performed for all or a subset of the documents (text or cases) and flagging may be done where a judgment is determined for a case and a final score is generated. The final score may be determined by sigmoid of cases count where an entity has lost the case. At step 928, classification process is implemented. This exemplary process ends at step 940.

An embodiment of the present invention may be directed to identifying a set of court (or administrative) case documents that have some impact (positive or negative) for a given company. This may involve identifying parties, types of parties, judgment/conclusion, etc. An embodiment of the present invention may be directed to identifying involved parties in each litigation judgement and using custom patterns and rules developed through prior litigation judgements from across jurisdictions. An embodiment of the present invention may be directed to matching searched entity identified parties and mapped to claimant or defendant in the case using advanced string similarity algorithms, such as Jaro Winkler, Rosette Name similarity score, fuzzy matching etc. For example, conclusion of the judgement may be identified using custom trained model based on Support Vector Machine (SVM) algorithm on dataset collected labelled over a period of months or other time period. The identified conclusion may then be interpreted to find out if the judgement was in favor or against the given entity.

An embodiment of the present invention may be further directed to distinguishing recent cases from old cases, etc. For example, a date of each article may be used to identify the age of the article. Other factors may be considered.

An embodiment of the present invention may be directed to classification and/or parsing. For example, identified risk events may be further classified into pre-defined categories of risk types using custom classifiers trained using classification algorithm. For custom classification design, certain requirements may be applied. This may involve an AM classification model based on client configured configurations. Each client and risk segment may have preconfigured classifiers (e.g., Financial Risk, Credit Risk, Money Laundering Risk, Reputation Risk, other risks that may be preconfigured, etc.) with a weight age score for each. There may be a default classifier "Other" which may contain risk events not classified under any of them. In addition, scoring logic may be changed to score based on weightage.

For an exemplary design, a total of 100 articles may be received for Entity1. After applying filters (e.g., negative dictionary, location, entity, etc.), a subset of 20 articles may be identified. The following is an exemplary output after applying clustering on the 20 articles:

Cluster 1—Articles 1, 2, 3
Cluster 2—Articles 4, 5, 6
Cluster 3—Articles 7, 8, 9
Cluster 4—Articles 10, 11, 12
Cluster 5—Articles 13, 14, 15
Cluster 6—Article 16
Cluster 7—Article 17
Cluster 8—Article 18
Cluster 9—Article 19
Cluster 10—Article 20

A sentiment threshold −0.2 may be applied to result in the following:

Cluster 1—Articles 1
Cluster 2—Articles 6
Cluster 3—Articles 7
Cluster 9—Article 19
Cluster 10—Article 20

According to an embodiment of the present invention, the AM score may be determined. A classification approach may be applied on the article with a highest negative score of each cluster which is a final risk event.

Schema for the rrf_ref_classification_rules_client may be represented as follows:

| id | classification_id | rule_type | search_words | context_words | Window_len | risk_segment_id |
|----|-------------------|-----------|--------------|---------------|------------|-----------------|
| 1 | 1 | SEARCH | rack up, rack, capital controls | 0 | 3 | |
| 2 | 1 | CONTEXT | bank, creditor | run, crisis, insolvency, closure | 4 | 3 |

According to an embodiment of the present invention, two types of rules may be used in classification. With Search Rules, for a basic keyword search in the article, if the given keyword is found that particular classification label may be assigned to the article.

Context Rules may involve a proximity search of multiple words occurring within a given window length. If any combination of keywords from search words and context words are found in the article, the classification label may be assigned to the article.

For Stock Trading risk type, apart from detecting risk type from Classification rules as mentioned above it should also pass the Linear Discriminant Analysis (LDA) Classifier Model. LDA Classifier Model Matches the ngram score between Article content and the words vector obtained by training a known data set related to Stock Trading with latent Dirichlet allocation.

Figure 10:
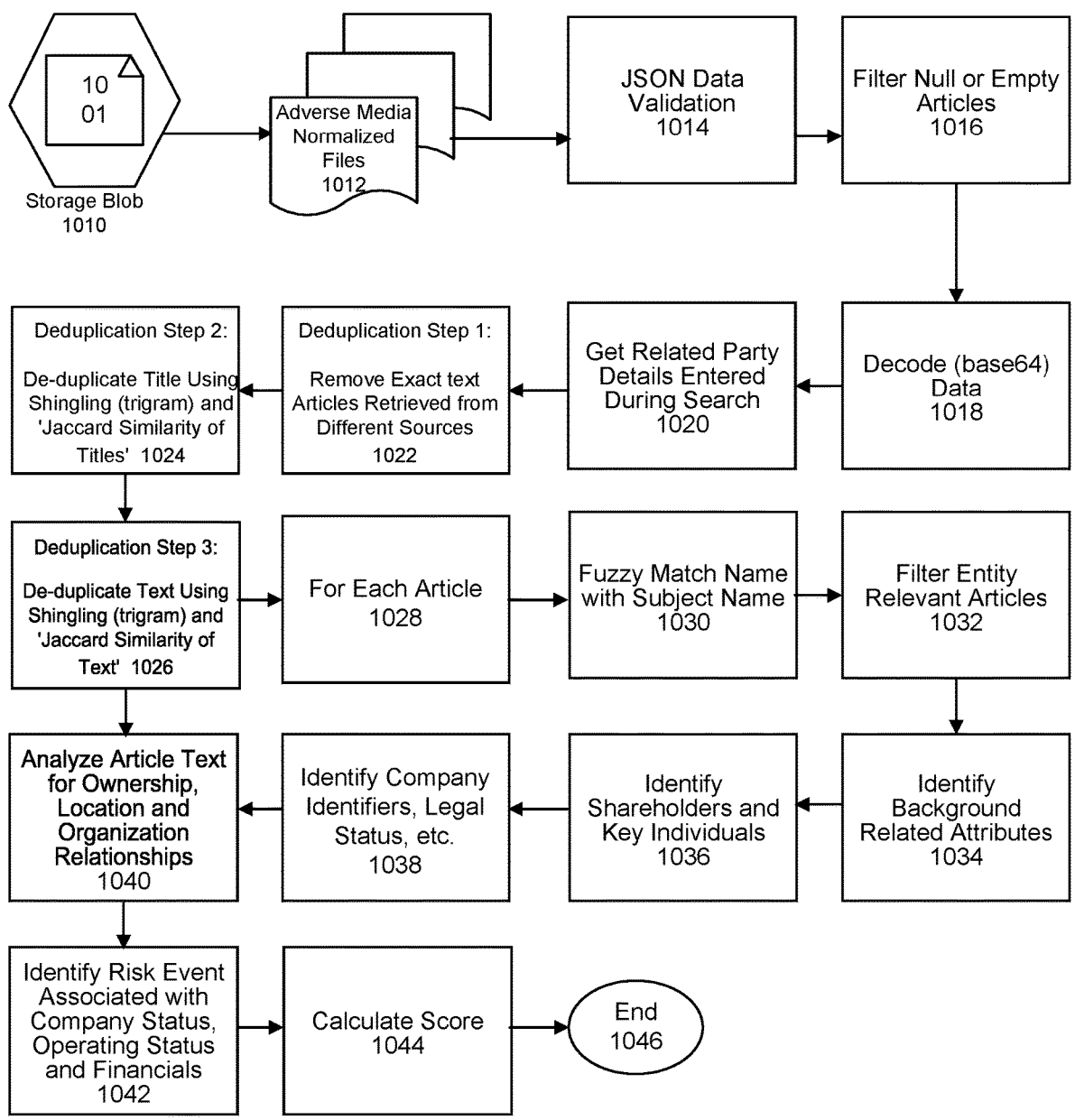
FIG. 10 is a flow diagram of background analytics, according to an embodiment of the present invention.

FIG. 10 is a flow diagram of background analytics, according to an embodiment of the present invention. Data may be stored and managed as storage blobs, represented by 1010. Other storage formats may be applied. Adverse media normalized files may be represented at 1012. At step 1014, data validation may be applied. This may include JSON data validation. At step 1016, null or empty articles may be filtered. At step 1018, data may be decoded. This may involve decoding base64 data. At step 1020, related party details entered during a search or other user interaction may be retrieved. At step 1022, Step 1 of a deduplication process may be initiated. This may involve removing exact text articles retrieved from different sources. At step 1024, Step 2 of a deduplication process may be applied. This may involve de-duplicating title using shingling (trigram) and Jaccard similarity of titles. At step 1026, Step 3 of a deduplication process may be applied. This may involve de-duplicating text using shingling (trigram) and Jaccard similarity of text.

At step 1028, for each article, a series of steps and processes may be applied. At step 1030, a matching process may be applied. This may involve a fuzzy match name with a subject name. At step 1032, entity relevant articles may be filtered. At step 1034, background related attributes may be identified. At step 1036, shareholders and key individuals may be identified. At step 1038, company identifiers, legal status and other information may be identified. At step 1040, article and text may be analyzed for ownership, location and organization relationships. At step 1042, risk event associated with company status, operating status and financials may be identified. At step 1044, a score may be calculated. The process may end at 1046.

Figure 11:
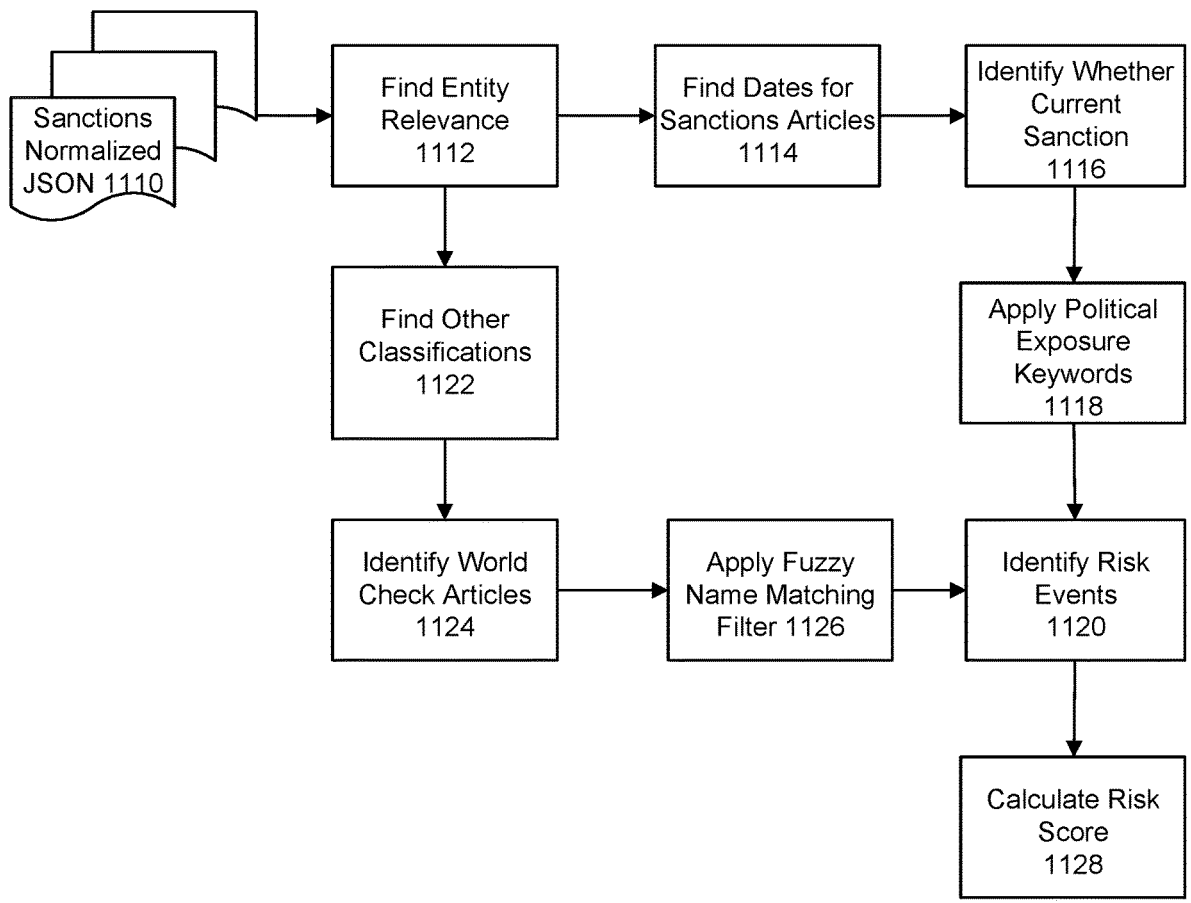
FIG. 11 is a flow diagram of sanctions analytics, according to an embodiment of the present invention.

FIG. 11 is a flow diagram of sanctions analytics, according to an embodiment of the present invention. For example, the sanctions analytics process may use static and dynamic sources like OFAC Sanctions, Interpol and other sanction list along with World Check to identify Risk events. Sanctions normalized JSON may be represented at 1110. At step 112, entity relevant may be determined. At step 1114, dates for sanctions articles may be identified. At step 1116, an embodiment of the present invention may determine whether the sanction is current. At step 1118, political exposure keywords may be applied. In addition, other classifications may be identified at step 1122. This may include law enforcement, regulatory enforcement, etc. At step 1124, world check articles may be identified. At step 1126, fuzzy name matching filter may be applied. At step 1120, risk events may be identified. At step 1128, risk score may be calculated.

An embodiment of the present invention may be directed to calculating a risk score. The risk score may include article-entity relevance, section relevance and risk relevance, for example.

According to an embodiment of the present invention, article-entity relevance may be directed to identifying whether the given article is relevant to an entity/individual of interest. This may involve: finding out the frequency an entity is referred in the given article; identifying the relevance of an entity with the article based on the entity reference frequency with respect to overall document content size; and filtering out articles which do not contain any reference of the entity.

Figure 12:
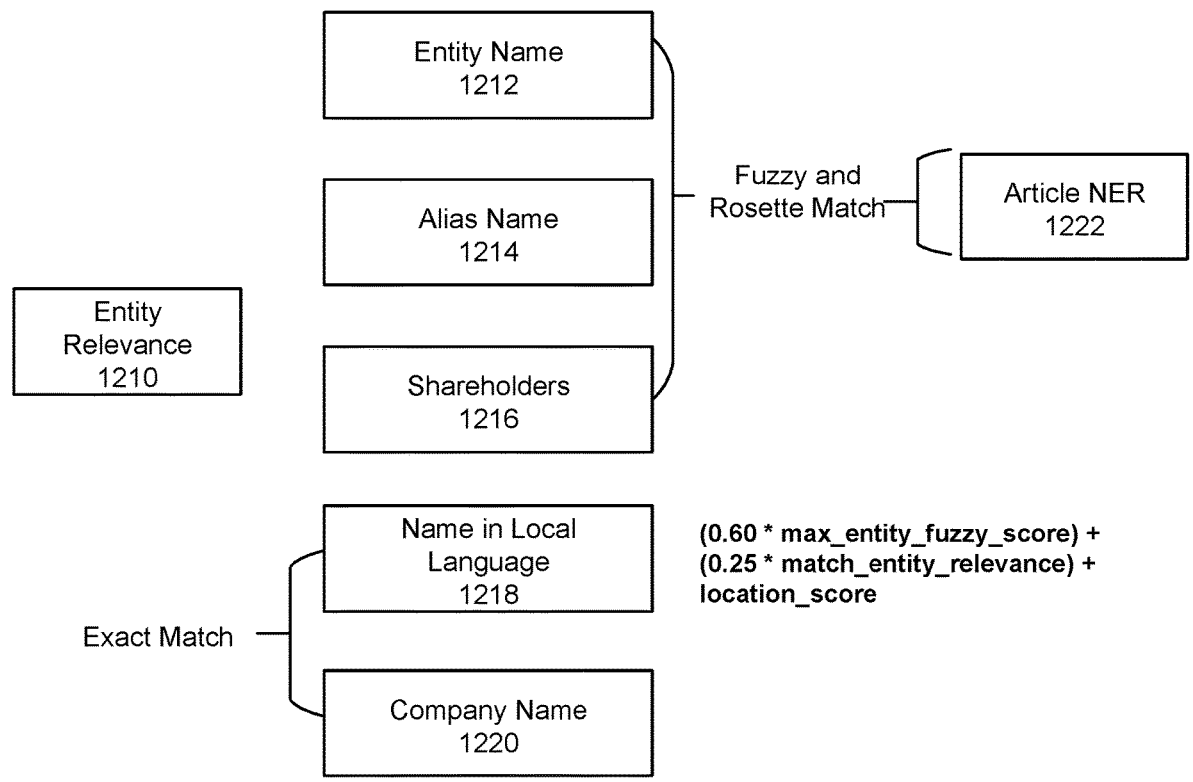
FIG. 12 is an illustration of entity relevance, according to an embodiment of the present invention.

FIG. 12 is an illustration of entity relevance, according to an embodiment of the present invention. Entity Relevance 1210 may be determined by analyzing various factors, including Entity Name 1212, Alias Name 1214, Shareholders 1216 via Fuzzy and Rosette Match and Article NER 1222. An exact match may be determined between name in local language 1218 and company name 1220. An exemplary equation may include:

$$(0.60*max\_entity\_fuzzy\_score) + (0.25*match\_entity\_relevance) + location\_score$$

According to an embodiment of the present invention, Article-Section classification may involve identifying sections for each article (e.g., Media, Litigation, Sanctions, etc.). For example, article classification may be based on annotation keywords for each section. Machine learning models may be used along with the keywords to improve the classification. In addition, one article may belong to more than one section.

An embodiment of the present invention may be directed to providing annotations as highlighted sections on a user interface. Annotations may highlight important information in the documents such as incorporation date, shareholders details, etc. Annotations may also include additional information, details as well as pointers or links to other additional data.

An annotation dictionary may be leveraged to provide annotations and other additional information. The annotation dictionary may include keywords and phrases for each section to be annotated. In addition, proximity rules may be applied for annotation. For example, a sentence may be annotated in which any dictionary keyword is present. Sentence segmentation may be performed using a natural language sentence tokenizer (e.g., NLTK sentence tokenizer). Machine Learning approach may be used to annotate negative content in the article for some of the sections.

According to an embodiment of the present invention, section relevance may involve computing article relevance with a section at annotation and article level. Section relevance may involve vectorizing each section using dictionary words/phrases of that section; vectorizing each annotated sentence; generating a section-vector and annotation-vector similarity using a vector similarity function which provides similarity between the vectors and generates a score in a predetermined range (e.g., −1 to 1). An embodiment of the present invention may normalize the score between 0 to 100 to get similarity score by multiplying the positive score with 100 and negative score with 0 (as negative similarity score signifies non-relevance text with the section context). Other normalization techniques may be applied.

For example, to get the score at an article level for each section, an embodiment of the present invention may take an average of a set of annotation relevance scores of that section for the article.

Annotation Relevance Score may involve generating a vector similarity score between each annotation and section dictionary words. An exemplary formula may include:

Annot_Score=rel_score*weightage_for_word

Rel_score may represent a vector similarity score and weight_for_word may represent calculation using a feedback loop.

For Article Section Relevance Score, a max similarity score of annotation for an article may be used to calculate a section relevance score for an article. An exemplary formula may include:

relevanceScore=(0.9)*article_annotation_relevanceScore+section_score

Article_annotation_relevanceScore may represent a max similarity score of annotation.

Section_score may be based on a source of an article.

An embodiment of the present invention may be directed to a Risk Relevance Score. For example, an embodiment of the present invention may score Adverse Media, Sanctions, Litigation, Background Information Risk Scores based on Risk Events generated. This process may be performed for various related parties, such as Shareholders and Directors.

Risk score for each section may be calculated using a sigmoid of number of risk events to generate S shaped curve and keep the score between a predetermined range, such as 0 and 1.

To calculate the overall risk score, an embodiment of the present invention may take a weighted average of risk segment scores generated. The weights may be configurable.

Final SOI score may be generated for each article and ranked based on relevance to the risk section like Adverse Media, Sanctions etc. An exemplary equation is shown below:

$$FinalScore(SOI) = \frac{2 * article\_section\_relscor * article\_entity\_rel * article\_risk\_rel}{article\_section\_relscor + article\_enetity\_rel + article\_risk\_rel}$$

An embodiment of the present invention may be directed to annotation enhancements.

Figure 13:
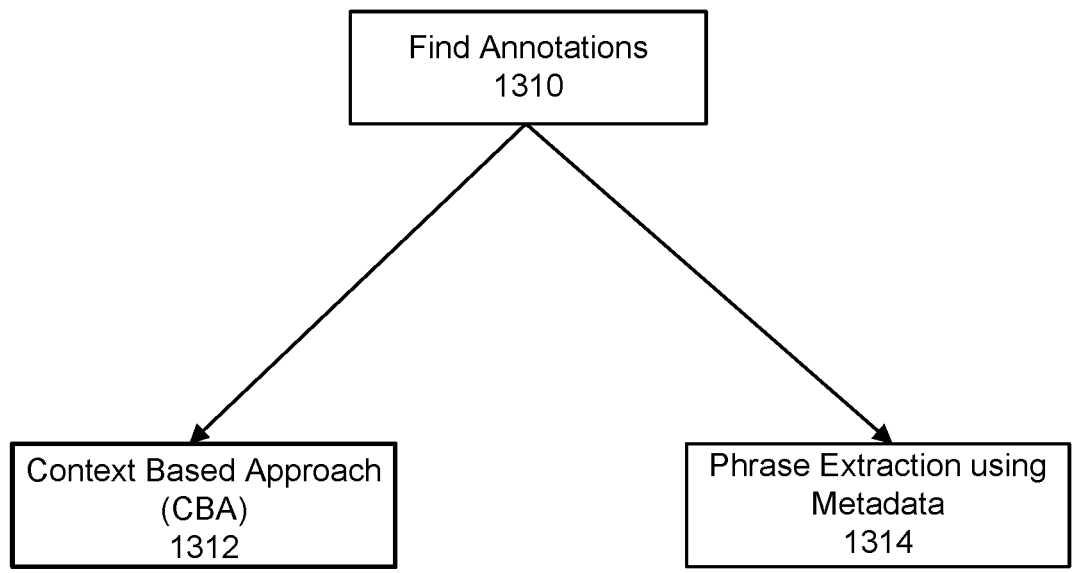
FIG. 13 is an exemplary illustration of annotation extractions, according to an embodiment of the present invention.

FIG. 13 is an exemplary illustration of annotation extractions, according to an embodiment of the present invention. Find Annotations 1310 may be applied. For example, if dictionary word match is determined in any sentence of an article, that sentence may be marked as an annotation. In addition, the article may be grouped into the same section of the matched word.

With Context Based Approach 1312, an embodiment of the present invention may match POS TAG of word in the dictionary with the POS TAG of word in sentence. If both POS TAG is same, it may be marked as Valid (True) Annotation. POS TAG represents Part of Speech Tagging which is a grammatical determination of a sentence to find noun, verb, article, adjective, preposition, pronoun, adverb, conjunctions, and interjections.

Phrase Extraction using Metadata 1314 may identify a semantic relation between NER and dictionary word. This may apply to person, organization, location date, money, etc.

Annotation extractions may be performed using Context Based Approach (CBA) and/or Phrase Extraction using Metadata. According to an exemplary embodiment, annotations may be categorized in two different categories: Valid (True) or Invalid (False) Annotations. Based on the category, annotations may be displayed on a user interface, such as in two different colors, darker shades (Valid Annotations) and lighter shades (Invalid Annotations). Other graphical representations may be applied.

For example, if there is a dictionary word match in any sentence of an article, the sentence may be marked as an annotation.

According to another example, annotation logic may be based on CBA and/or Phrase Extraction using Metadata Method. In this example, if there is a dictionary word match in a sentence of an article (as identified above), the following may be applied. With CBA, an embodiment of the present invention may match POS TAG of a word in the dictionary with the POS TAG of a word in a sentence. If both POS TAG is same, it may be marked as a Valid (True) Annotation.

With Phrase Extraction using Metadata Method, if CBA fails, an embodiment of the present invention may identify a word and its related metadata. Metadata (e.g., entity types) used may include PERSON, ORGANIZATION, LOCATION, DATE, MONEY, etc. An embodiment of the present invention may look for a word and any of these entity types present in sentence and determine any semantic relations with the entity. If yes, an embodiment of the present invention may look for a word relation mapping in Metadata file. If both are same, it may be marked as Valid Annotations.

According to an embodiment of the present invention, metadata files may store the relation between dictionary words and Entity Types (e.g., Metadata). A phrase extraction algorithm may be applied on dictionary words and Golden Report Data to capture relation with Metadata (Entity Types). This may be used to create the metadata file. Further, the Metadata File may be stored on an object storage service, e.g., S3 bucket in Pattern.json file. This file may be updated with each release or update based on Golden Report Data.

For example, a Flag for Annotation may be stored in "WORD_POS" filed in EDD_ARTICLE_ANNOTATION Table where True: Valid Annotations and False: Invalid Annotations.

An embodiment of the present invention is directed to improving article relevance score and enrich annotation using a Feedback Loop. The Feedback Loop may apply keywords/phrases in the base dictionaries with weightage assignment and calculation logic, thereby making the tool self-learning and improving article relevance score and annotation quality.

An embodiment of the present invention may be directed to weightage assignment and re-calculation. This may involve creating up to quad-grams of the feedback corpus text and ranking uni-grams, bi-grams, tri-grams, quad-grams based on Frequency in the entire corpus. This corpus text data may be used for base dictionary key word weightage calculation.

An exemplary weightage recalculation procedure may include the following steps: Iterate dictionary words/key phrases across entire text corpus. If the word/phrase is found in ranked feedback corpus terms, the weightage recalculation for that word/phrase would be: Weightage of the word calculated as 0.8+0.2*(inverse rank of the word in feedback corpus terms/total number of feedback corpus terms). If the words/phrase is not found in ranked feedback corpus terms, default weightage of 0.5 will remain there.

With an embodiment of the present invention, an annotation relevance score may be recalculated by multiplying it with the word weightage. In addition, annotation quality may be enriched. This may involve various approaches, including calculating individual article term weightage using tf-idf approach and explore its impact. Another approach may involve: using a text parser to separate (e.g., Subject, Object and Modifiers)/POS TAG. Using the position of keyword/phrases in three sections, the weightage of the keyword/phrase may be recalculated.

Another approach may involve including polarity of the annotation to determine negativity of annotation. For example, this may be specific to AM.

Yet another approach may include pattern identification of the annotation highlighted specific to different sections.

Figure 14:
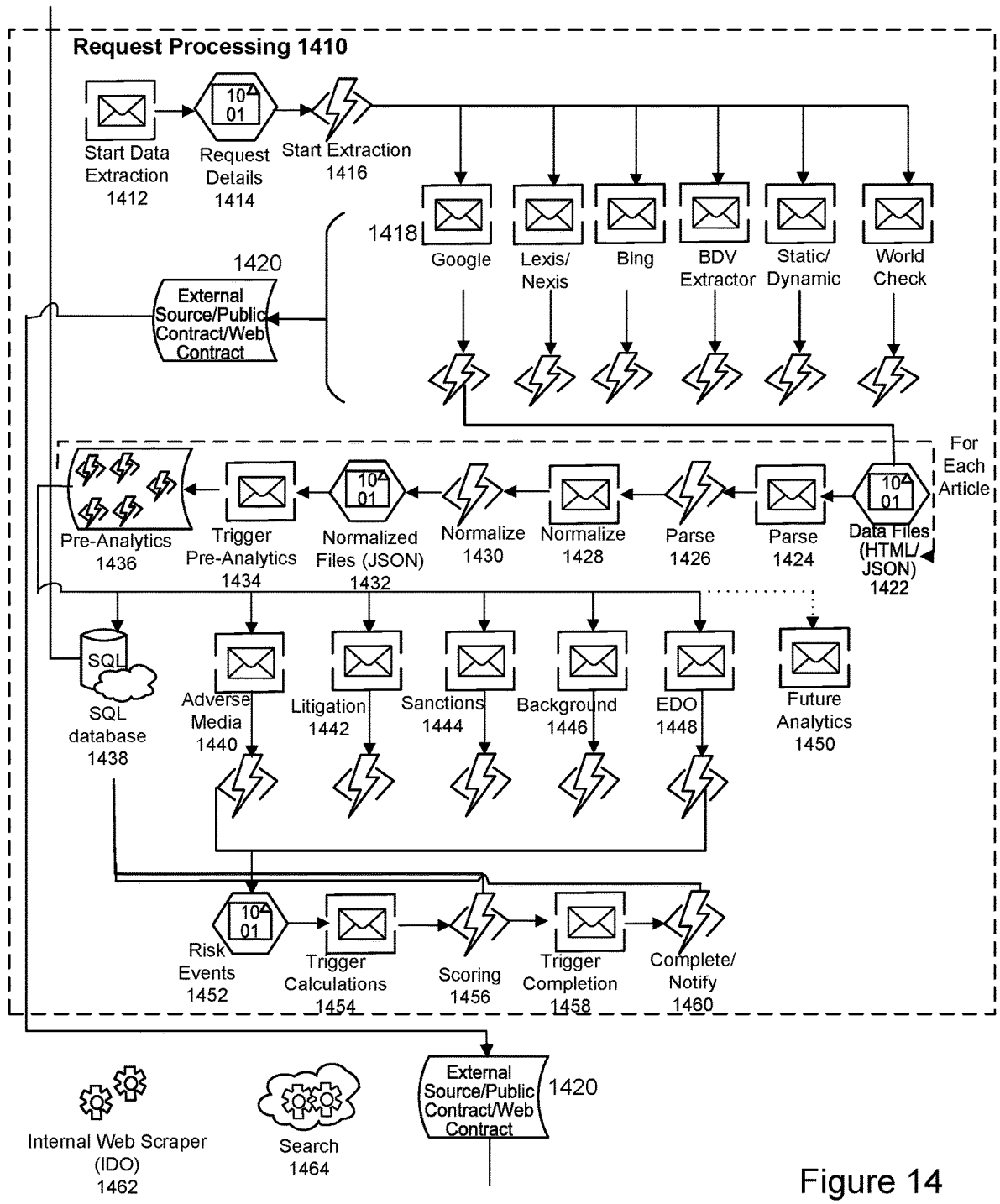
FIG. 14 is an exemplary illustration of request processing, according to an embodiment of the present invention.

FIG. 14 is an exemplary illustration of request processing, according to an embodiment of the present invention. Data extraction may be initiated at 1412 and details may be requested at 1414 which then starts the extraction process at 1416. Various sources of data may be represented at 1418. Other sources may be represented by External Source 1420 as well as Internal Web Scrapper 1462 and Search 1464.

For each article, a set of processes may be applied including Data Files 1422, Parse 1424, 1426, Normalize 1428, 1430, Normalize Files 1432, Trigger Pre-Analytics 1434, Pre-Analytics 1436. Data may be stored and managed in a database, such as SQL database 1438. Analytics may be applied to determine various risk areas, including Adverse Media 1440, Litigation 1442, Sanctions 1444, Background 1446, EDO 1448 and additional analytics represented by Future Analytics 1450. The analytics may be further processed to determine Risk Events 1452, Trigger Calculations 1454, Scoring 1456, Trigger Completion 1458 and Complete/Notification 1460.

Figure 15:
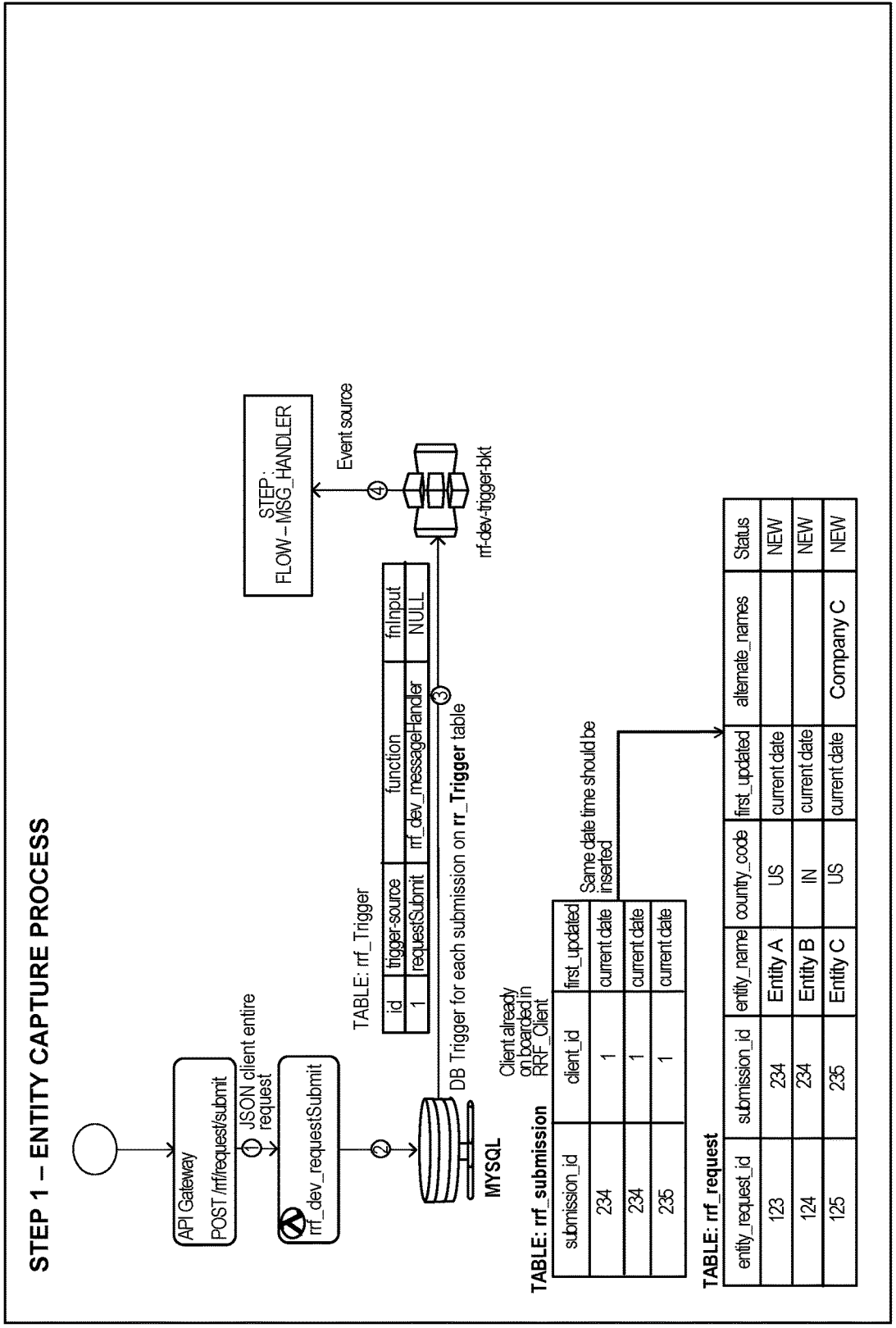
FIG. 15 illustrates an example of the assessment request flow process according to an embodiment of the invention.

FIG. 15 illustrates an example of an assessment request flow process according to an embodiment of the present invention. FIG. 15 illustrates an entity capture process.

Figure 16:
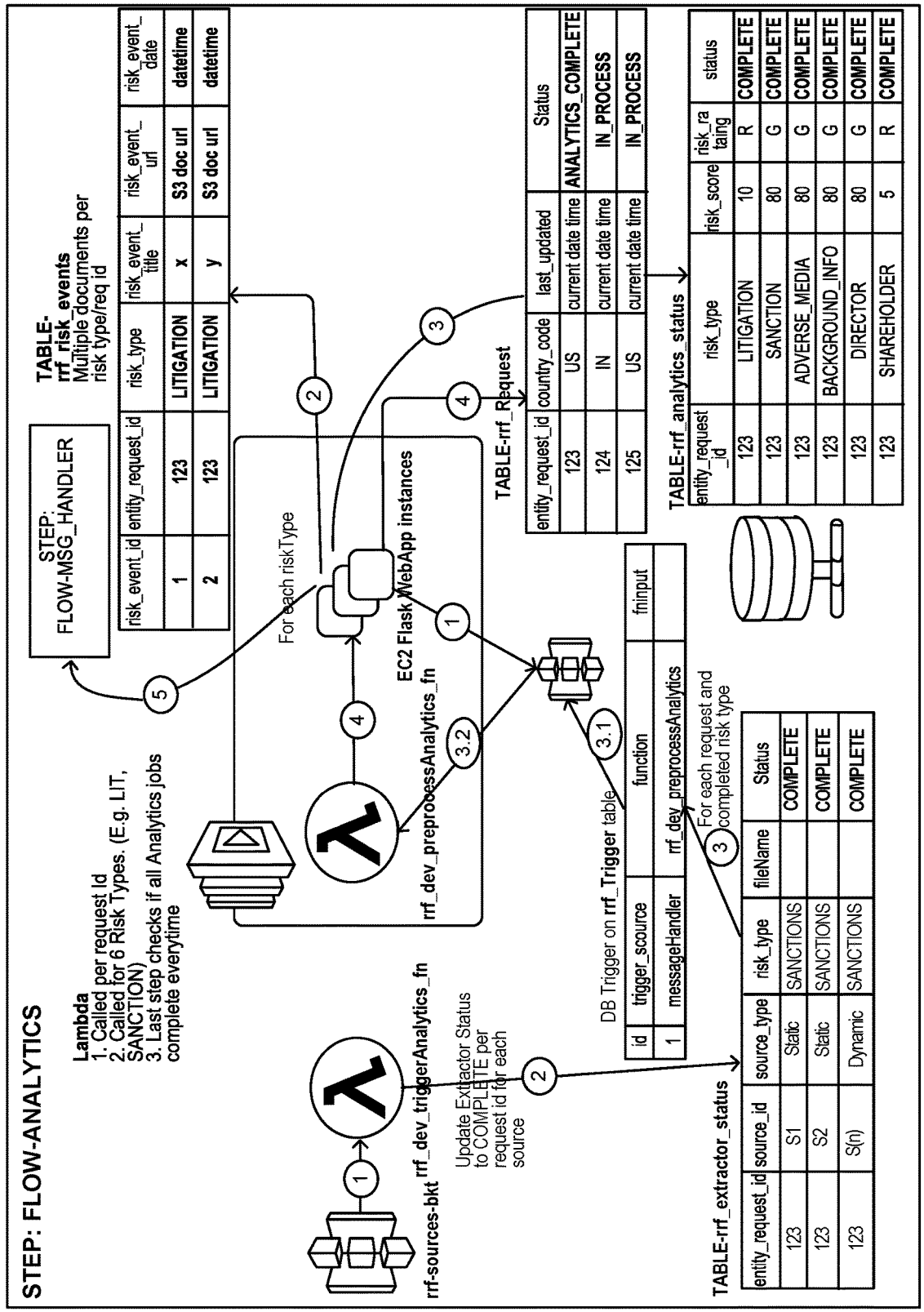
FIG. 16 illustrates an example of execution flow of risk analytics according to an embodiment of the invention.

FIG. 16 illustrates an example of execution flow of risk analytics according to an embodiment of the invention. The exemplary illustration of FIG. 16 utilizes an Amazon Simple Storage Service (Amazon S3) for orchestration of various risk analytics models used in a due diligence assessment. Various other types of services or servers may be implemented within the scope of the disclosure. FIG. 16 illustrates a flow analytics step.

Figure 17:
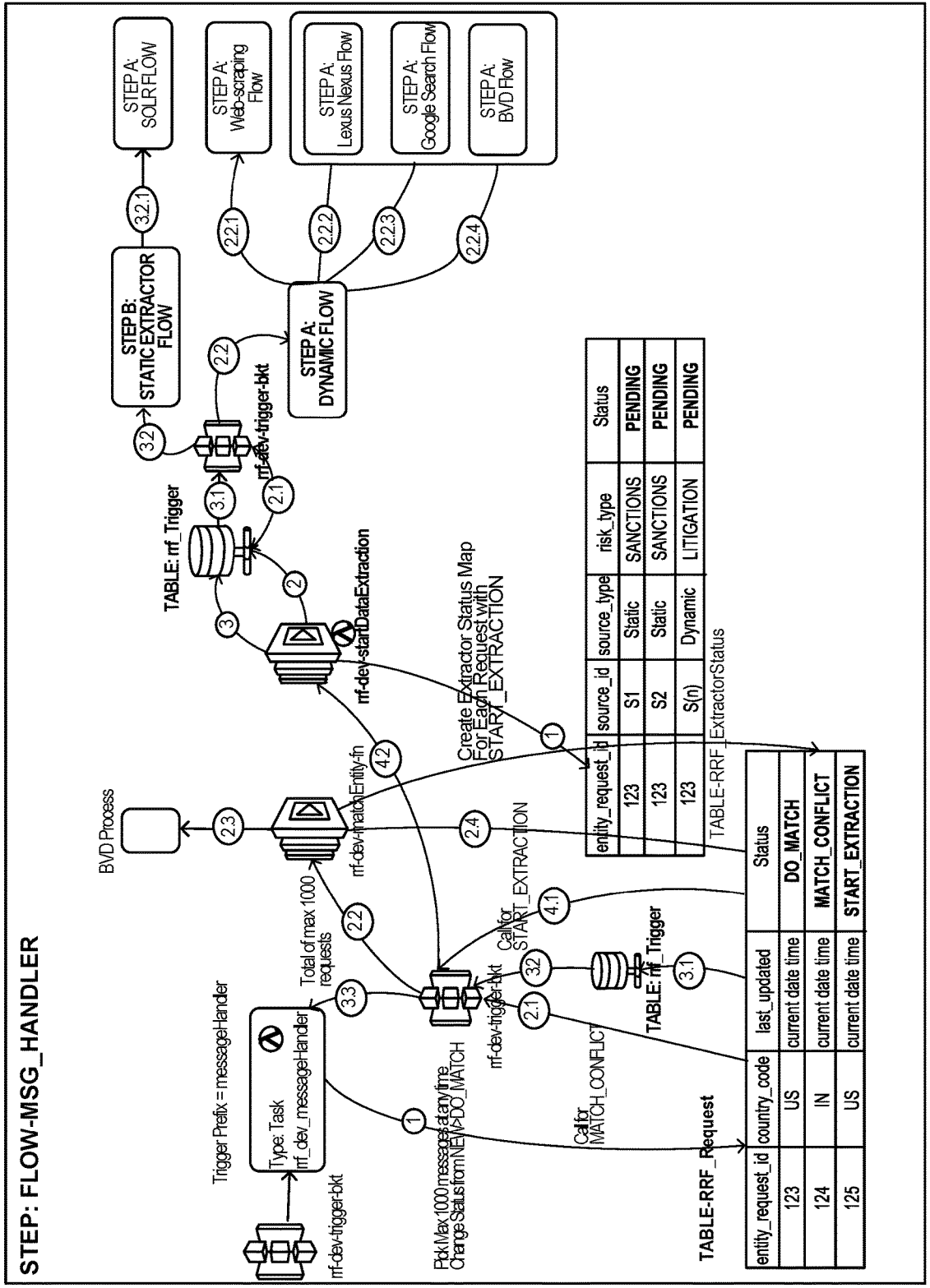
FIG. 17 illustrates an example of the execution of an incoming assessment request according to an embodiment of the invention.

FIG. 17 illustrates an example of the execution of an incoming assessment request (FLOW-MSG HANDLER) according to an embodiment of the present invention. The flow message handler may be included as part of flow analytics in the embodiment shown in FIG. 16. In FIG. 17, the flow message handler includes Step A (dynamic content extractor flow) and Step B (static content extractor flow).

Figure 18:
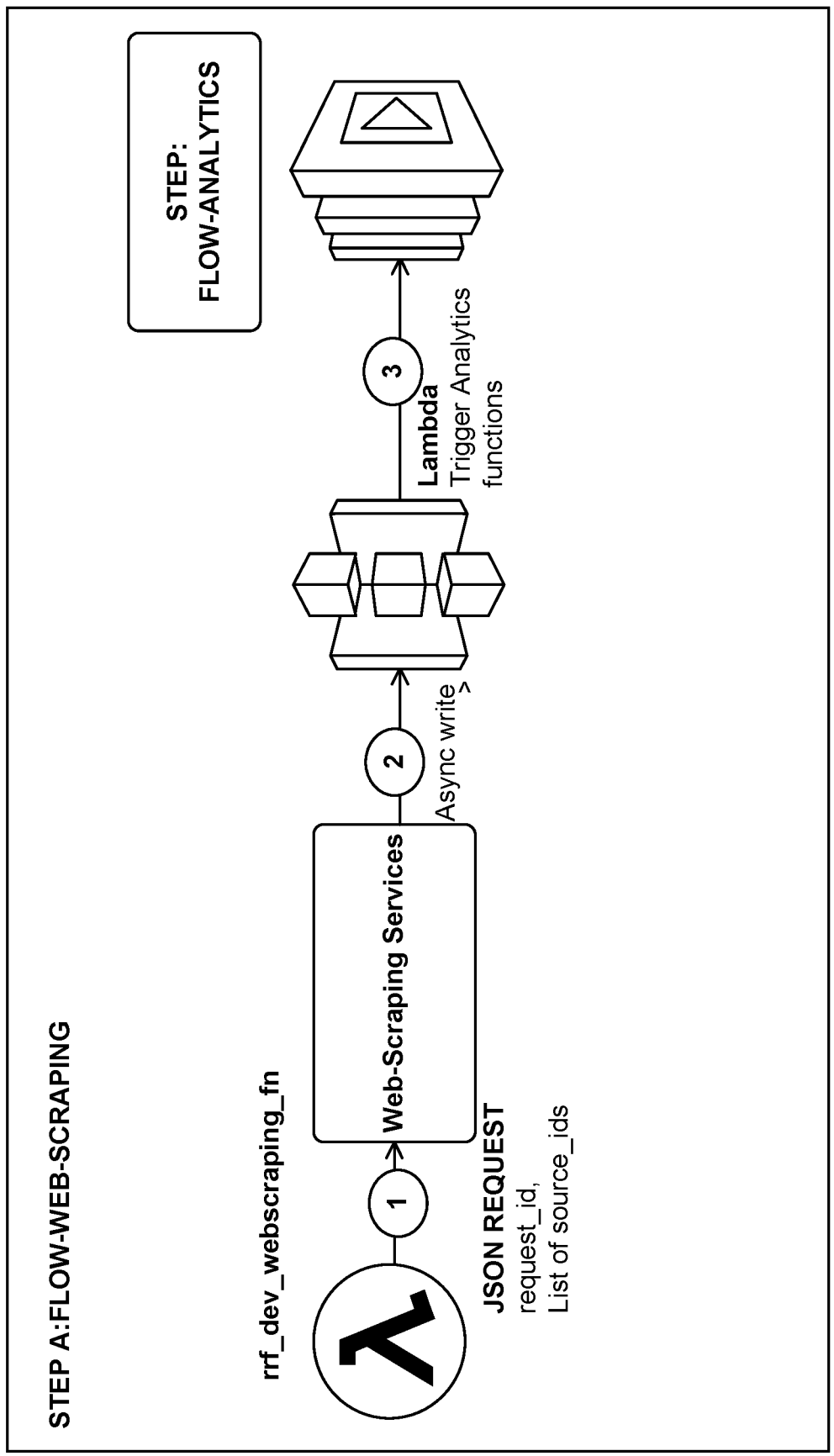
FIG. 18 illustrates an example of the execution of content sourcing according to an embodiment of the invention.

FIG. 18 illustrates an example of web scraping based content extraction flow (FLOW-WEB-SCRAPING) according to an embodiment of the present invention. This flow may be included as part of Step A (dynamic flow) in the flow message handler in the embodiment shown in FIG. 17.

Figure 19:
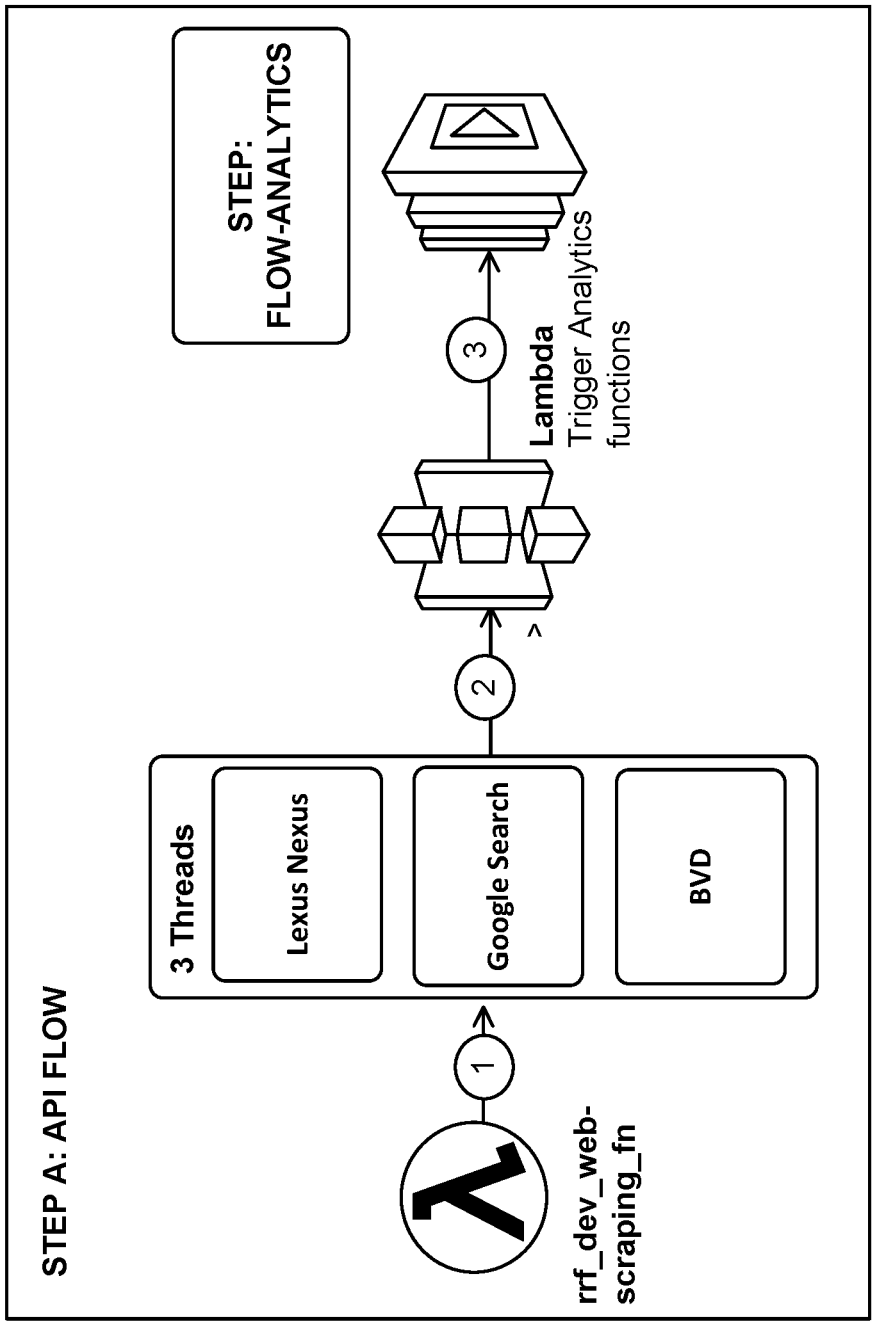
FIG. 19 illustrates an example of the execution of sourcing from data aggregators according to an embodiment of the invention.

FIG. 19 illustrates an example of an application program interface (API) flow (API Flow) according to an embodiment of the present invention. The API flow may be included as part of Step A (dynamic flow) in the flow message handler in the embodiment shown in FIG. 17.

Figure 20:
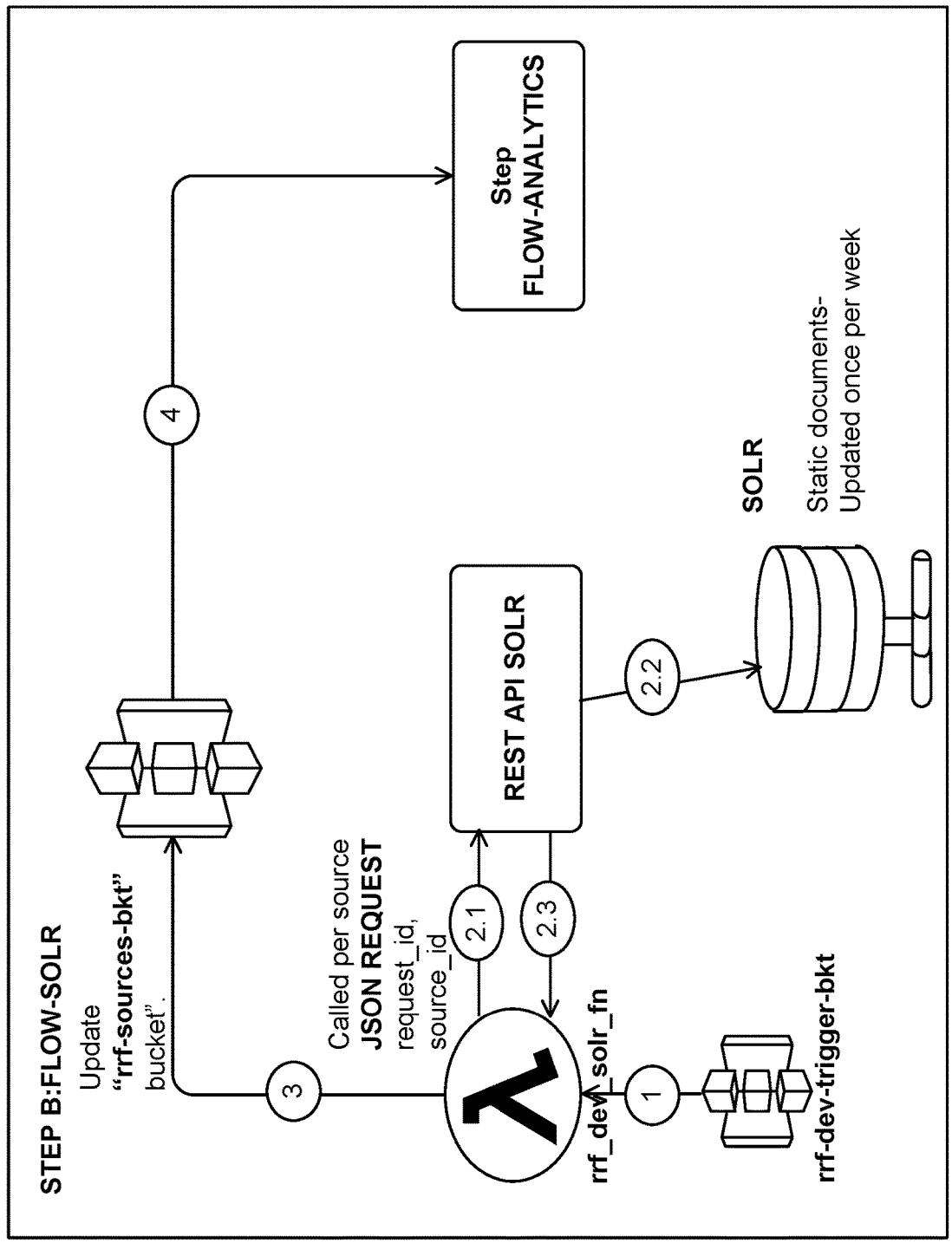
FIG. 20 illustrates an example of the use of a document search engine according to an embodiment of the invention.

FIG. 20 illustrates an example of a static content extractor flow (FLOW-SOLR) according to an embodiment of the present invention. SOLR represents an exemplary search platform. The static content extraction flow may be included as part of Step B (static extractor flow) in the flow message handler in the embodiment shown in FIG. 17.

Figure 21A:
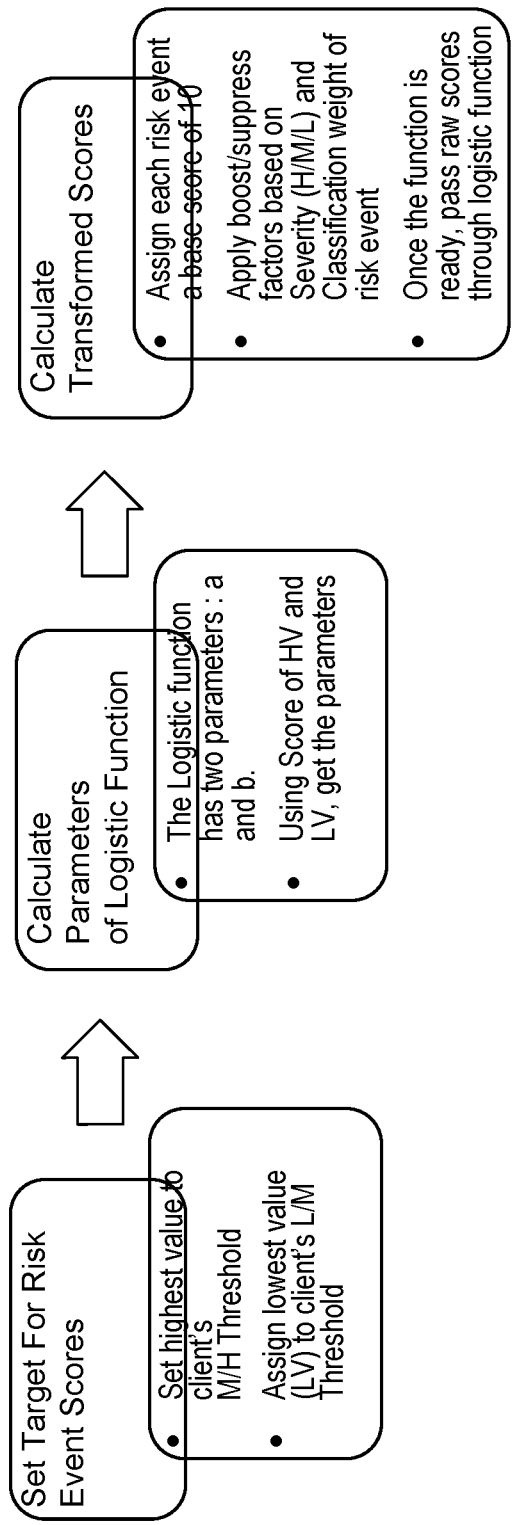
FIGS. 21A-B illustrate an example of a risk scoring event methodology according to an embodiment of the invention.
Figure 21B:
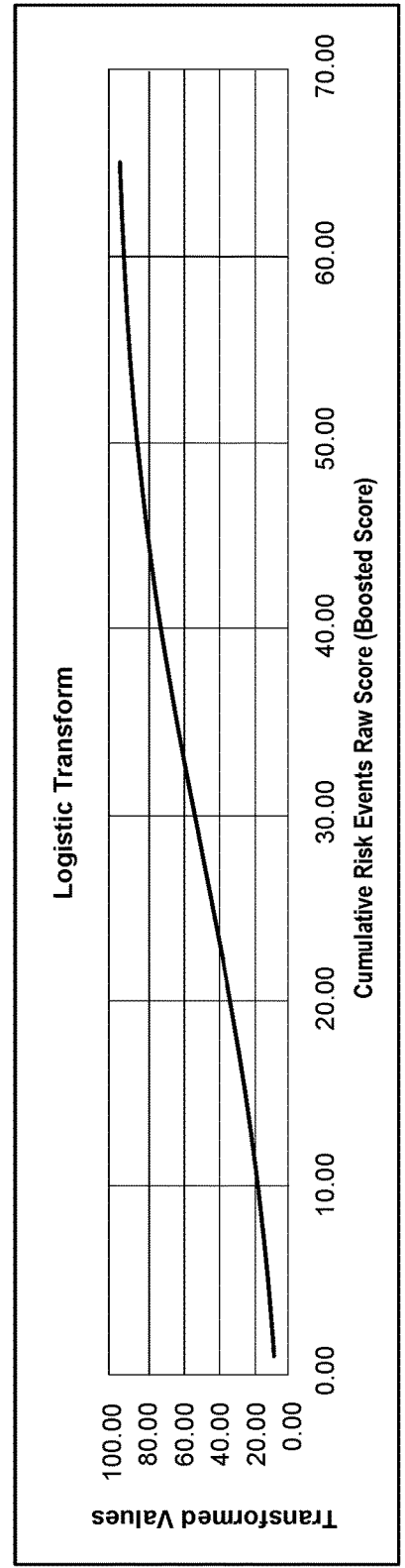

FIGS. 21A-B illustrate an example of a risk event scoring methodology as it relates to determining adverse media risk according to an embodiment of the present invention. Those skilled in the art will appreciate that various risk event scoring methodologies for various applications may be implemented within the scope of the disclosure.

The following example describes a process of solution development for adverse media analytics which may include the following high level tasks: sample data generation; de-duplication of input article corpus; extraction of relevant text from each document corresponding to the target entity; clustering of articles corresponding to similar events; and classification of sentences into general/neutral versus sentiment/opinion exhibiting and entity sentiment analysis. Although specific embodiments are described with respect to adverse media analytics, those skilled in the art will appreciate that methods and systems for analyzing the integrity due diligence risk associated with third-party entities and individuals associated with third-party entities are applicable to various other types of risk analyses.

According to an embodiment of the present invention, as part of sample data generation, a corpus of negative sentences may be generated for some of the target entities which have been classified to design the analytics solution and also to use in the validation of analytics models. A list of negative terms also may be generated for use in solution development. In an illustrative example, the task of sample data generation may involve the following sub-tasks: (a) Multiple news article links may be retrieved from diligence reports previously produced by subject matter experts, and may be spread across multiple news categories for multiple entities/companies present in one or more due diligence reports; and (b) Analysis produces multiple (e.g., 368) negatives sentences (in the context of target entity) and multiple (e.g., 640) negative terms (marked to be used as a part of negative terms sample dictionary) to be applied during solution development process.

According to an embodiment of the present invention, as part of de-duplication of input article corpus, the same or similar news articles reported by various sources may be identified and filtered out. For example, a third-party aggregator may use various sources to gather news articles, thereby increasing the chance of redundancy of the same news story being reported by different sources. In an illustrative example, the task of de-duplication of input article corpus may involve the following sub-tasks: (a) Analysis of data may be performed to understand what kind of duplicative articles are present; (b) First level of de-duplication may be implemented using exact match of article titles; (c) Second level of de-duplication may be implemented using trigram shingling of article title and their match score using a technique such as Jaccard Similarity (e.g., after some heuristics, a Jaccard Similarity score of 0.9 may be decided as the threshold); and (d) Third level of de-duplication may be implemented using trigram shingling of article text and their match score using a technique such as Jaccard Similarity (e.g., after some heuristics, a Jaccard Similarity score of 0.9 may be decided as the threshold).

According to an embodiment of the present invention, extraction of relevant text from each document corresponding to the target entity may be applied to focus only on the relevant text (and hence on relevant articles) and discard remaining parts of the news/articles to reduce further processing and redundancy in identifying risk events. News articles generally summarize the event using a title followed by a lead ("lede"). "Lede" refers to opening sentences or paragraph to summarize the most important aspect of a story. For example, the task of extraction of relevant text from each document corresponding to the target entity may involve the following sub-tasks:
(a) Create a negative terms dictionary from open-source available negative word lists and one or more lists extracted from the process of sample data generation;
(b) Clean the target entity article corpus by removing tokens such as new line characters, tabs, stop words, special characters, numbers, etc.;
(c) Perform co-reference resolution to replace pronoun references of the target entity name with the actual target entity name; and
(d) Apply different filters to filter out articles which do not meet a set of criteria which may be finalized after heuristics. The set of criteria may include: (1) Contains at least some occurrences of the fuzzy matched target entity name (e.g., fuzzy matching of target entity name is on Named Entities extracted from the article corpus); (2) Contains at least some negative terms from the negative terms dictionary; and (3) Content size is between some predetermined range of character count.

The above criteria are mere examples of numerical boundaries for filtering the articles. Other criteria may be applied within the scope of the disclosure.

According to an embodiment of the present invention, clustering of articles corresponding to similar events may be applied. For example, any event related to any entity in the real world may be captured by various news agencies and publications. Hence, news articles corresponding to the same news event may be clustered together, and if the event turns out to be negative, then only one representation of that event may be reported in the client dashboard.

According to an embodiment of the present invention, the task of clustering of articles corresponding to similar events may involve the following sub-tasks:
(a) Clean the articles in the corpus in a manner similar to de-duplication;
(b) Tokenize the articles and apply Named Entity Recognition (NER) to extract and remove all named entities from the corpus;
(c) Perform position (POS) tagging of tokens and keep only nouns, adjectives, adverbs and verbs for each article (e.g., union set of leftover tokens forms the vocabulary for clustering);
(d) Create various matrices for trying clustering like tf-idf, count, binary, etc.;
(e) Use clustering algorithms on each matrix and get cluster labels;
(f) Tune clustering algorithms with different values of EPS (e.g., maximum distance between two points to fall in the same cluster) and minimum number of points in a cluster; and
(g) After heuristics, tf-idf matrix and HDBSCAN algorithm may be selected if it shows the best results (e.g., for minimum number of articles per cluster, a value of 3 may be chosen; best EPS value may be estimated by HDB SCAN internally at run-time).

According to an embodiment of the present invention, some or all the steps above may be bundled into a Python function. For example, an algorithm for cluster summarization using word cloud may be designed based on trigrams of negative terms and entity name.

According to an embodiment of the present invention, classification of sentences into general/neutral versus sentiment/opinion exhibiting and entity sentiment analysis may be applied. In some implementations, these may be considered highly important and critical steps in adverse media risk detection for a target entity. It is important that most of the negative events are captured, but at the same time, no or minimum false positive events are captured.

According to an embodiment of the present invention, these two steps may be designed together by applying the following steps:
(a) Parsing the article corpus after execution of above steps through the dictionary of negative terms to find sentences which have negative terms as well as the target entity present;
(b) Parsing the articles through a Contextual Entity Sentiment Analysis NLP model to find sentences which have negative terms present in relation with the target entity;
(d) Perform Word Sense Disambiguation (WSD) to check if the negative terms found in a sentence actually infer negative sentiment in the context of the respective sentence; and
(e) Other Deep NLP techniques like application of Dependency Parse trees may be applied within performance constraints as this technique is known to be processing time intensive.

In some implementations, a trade-off may exist between precision and recall in terms of flagging risk events. For example, to improve the precision and recall of analytics, domain-specific list of negative terms and generic terms may be needed to classify the data and screen flagged events with an aim to reduce false positives (FPs) and to detect more true positives (TPs).

In another example, methods and systems for analyzing integrity due diligence risks associated with third-party entities and individuals associated with third-party entities according to embodiments of the disclosure may be applied to litigation analytics. Such litigation analytics may help risk analysts quickly and accurately determine any event that may have a negative impact for their clients intending to transact with any particular company. One of the events that affects transactional risks may be any judicial or administrative matter in which a company may be involved. For example, a litigation analytics module may be implemented to identify such events, and to arrive at an aggregate litigation-based "risk score" for a given company.

In an embodiment of the present invention, the litigation analytics module may consume a set of court (or administrative) case documents identified to have some impact (either positive or negative) for a given company. It may then analyze each of these case documents to determine whether the result of that case affected the company in a positive or negative manner. Based on this analysis, a score may be generated that takes into account the negativity (or risk) of the resolution of each of these cases. An existing problem with conventional systems and methods is parsing of free-flow text that constitutes each of these documents, and extraction of the relevant information.

As an illustrative example, the input for the documents may include a list of court cases given in plain text. A set of analyses listed below may progressively arrive at a litigation risk score:

(1) Metadata extraction—metadata for the court (or administrative) cases may be extracted. Metadata extracted from such cases may include: (a) the date for the court case; (b) the list of parties; and (c) the type of each of the parties (e.g., whether they are petitioners, defendants, appellants, etc.);

(2) Conclusion identification—identify sections of court (or administrative) documents that are most likely to include a conclusion;

(3) Judgement extraction—based on the outcome of step (2), specific set of sentences in the conclusion section that contains the judgment may be extracted;

(4) Judgment parsing—once the location where the judgment is expressed is identified, identify the subject matter (e.g., how the judgment went for each of the parties);

(5) Identification of related cases, which may be performed by using these steps: (a) identify cases involving the same set of parties and the same subject; (b) identify the most recent of these cases; (c) only consider the judgment of this recent case, and discard all older cases (if appropriate); and (6) Compute score based on all distinct recent cases.

The systems and methods according to embodiments of the disclosure may be implemented where text of the case files may be obtained. Such case files may be obtained from jurisdictions outside the United States, for example.

Those skilled in the art will appreciate that the diagrams discussed above are merely examples of a system for intelligent computer based automation and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for providing integrity due diligence on behalf of a company seeking to create a business relationship with a potential third-party product or service provider, comprising:
   a memory for storing and managing data;
   a user interface that electronically receives user input; and
   a processor coupled to the memory and the user interface,
   the processor configured to determine an adverse media risk score associated with the potential third-party product or service provider based on negative sentiment from a plurality of news feed articles, the determination of the adverse media risk score comprising:
      creating at least one news article source list for the third-party entity;
      triggering, for each of the at least one news article source list, a data extraction function to form a news article corpus based on each of the at least one source list, the data extraction function comprising:
         executing an automated data extraction through scraping of website content in a plurality of different data types from one or more websites for each news article source list;
         parsing the extracted data into a common data type; and
         normalizing the parsed data from a raw format into a common format grouped by a plurality of data categories;
      performing a de-duplication of each news article from the news article corpus based on a similarity index, wherein the de-duplication process is based on one or more of exact title, similar title and similar content;
      extracting one or more relevant texts from the news article corpus, the extraction comprising:
         creating a negative terms dictionary;
         applying the negative terms dictionary to the news article corpus to find matches between words in the negative terms dictionary and in the news article corpus wherein a minimum number of matches is required for text to be considered relevant text;
         applying an organization filter to the news article corpus comprising (1) normalizing the potential third-party product or service provider name against a set of keywords and (2) counting the number of occurrences of the normalized third-party product or service provider name within each document in the news article corpus, wherein a minimum number of occurrences is required for text to be considered relevant text from a document within the news article corpus;
         applying a character count filter to the news article corpus comprising (1) determining a mean number of article characters for the news article corpus and (2) discarding any article from the news article corpus that has a character count that is over two standard deviations away from the mean; and
         applying weights to each document in the news article corpus by determining a proximity of words in the negative terms dictionary to the normalized third-party product or service provider name;
      clustering a set of news articles corresponding to a potential risk event such that only one potential risk event may be identified from the set of news articles, wherein the clustering is achieved by density based spatial clustering of application with noise to identify similar type of events within a given time frame;
      performing a classification of sentences to determine a sentiment score;
      identifying a risk event, wherein the risk event comprises one or more of: litigation, sanctions, adverse media, background and key individuals;
      calculating a risk score for each risk event based on an entity relevance, a section relevance, and a risk relevance; and
      based on the risk score, generating, via the user interface, an output wherein the output comprises a graphic that illustrates each risk event and supporting articles generated via machine learning algorithm that identifies negative content.

2. The computer-implemented system of claim 1, wherein the risk score is associated with a third-party entity.

3. The computer-implemented system of claim 1, wherein the one or more annotations are based on a context-based approach based on a position (POS) Tag of a word.

4. The computer-implemented system of claim 1, wherein the one or more annotations are based on a phrase extraction using metadata.

5. The computer-implemented system of claim 1, wherein the one or more annotations is based on an annotation relevance score that generates vector similarity score between each annotation and one or more dictionary words.

6. The computer-implemented system of claim 1, wherein the generating a risk event further comprises assessing litigation risk by identifying party and party type and performing conclusion analysis based on a pre-trained conclusion identifier model.

7. The computer-implemented system of claim 1, wherein the generating a risk score further comprises determining article-entity relevance, article-section relevance and risk relevance.

8. The computer-implemented system of claim 1, wherein extracting one or more relevant texts from the article corpus further comprises identifying an entity using a name entity recognition (NER) technique.

9. The computer-implemented system of claim 1, wherein clustering a set of articles is based on density based spatial clustering to identify similar types of events within a predetermined time frame.

10. The computer-implemented system of claim 1, wherein the determined sentiment is further validated against one or more negative events using a dependency parsing technique.

11. The computer-implemented system of claim 1, wherein the weights and the plurality of filters are configurable by a user.

12. The computer-implemented system of claim 1, wherein a feedback loop is applied to further analyze one or more golden reports in order to generate one or more weights for words in the negative terms dictionary.

13. A computer-implemented method for providing integrity due diligence on behalf of a company seeking to create a business relationship with a potential third-party product or service provider, comprising the steps of:
   determining an adverse media risk score associated with the potential third-party product or service provider based on negative sentiment from a plurality of news feed articles, the determination of the adverse media risk score comprising:
      creating at least one news article source list for the third-party entity;
      triggering, for each of the at least one news article source list, a data extraction function to form a news article corpus based on each of the at least one source list, the data extraction function comprising:
         executing an automated data extraction through scraping of website content in a plurality of different data types from one or more websites for each news article source list;
         parsing the extracted data into a common data type; and
         normalizing the parsed data from a raw format into a common format grouped by a plurality of data categories;
      performing a de-duplication of each news article from the news article corpus based on a similarity index, wherein the de-duplication process is based on one or more of exact title, similar title and similar content;
      extracting one or more relevant texts from the news article corpus, the extraction comprising:
         creating a negative terms dictionary;
         applying the negative terms dictionary to the news article corpus to find matches between words in the negative terms dictionary and in the news article corpus wherein a minimum number of matches is required for text to be considered relevant text;
         applying an organization filter to the news article corpus comprising (1) normalizing the potential third-party product or service provider name against a set of keywords and (2) counting the number of occurrences of the normalized third-party product or service provider name within each document in the news article corpus, wherein a minimum number of occurrences is required for text to be considered relevant text from a document within the news article corpus;
         applying a character count filter to the news article corpus comprising (1) determining a mean number of article characters for the news article corpus and (2) discarding any article from the news article corpus that has a character count that is over two standard deviations away from the mean; and
      applying weights to each document in the news article corpus by determining a proximity of words in the negative terms dictionary to the normalized third-party product or service provider name;
      clustering a set of news articles corresponding to a potential risk event such that only one potential risk event may be identified from the set of news articles, wherein the clustering is achieved by density based spatial clustering of application with noise to identify similar type of events within a given time frame;
      performing a classification of sentences to determine a sentiment score;
      identifying a risk event, wherein the risk event comprises one or more of: litigation, sanctions, adverse media, background and key individuals;
      calculating a risk score for each risk event based on an entity relevance, a section relevance, and a risk relevance; and
      based on the risk score, generating, via the user interface, an output wherein the output comprises a graphic that illustrates each risk event and supporting articles generated via machine learning algorithm that identifies negative content.

14. The computer-implemented method of claim 13, wherein the risk score is associated with a third-party entity.

15. The computer-implemented method of claim 13, wherein the one or more annotations are based on a context-based approach based on a POS Tag of a word.

16. The computer-implemented method of claim 13, wherein the one or more annotations are based on a phrase extraction using metadata.

17. The computer-implemented method of claim 13, wherein the one or more annotations is based on an annotation relevance score that generates vector similarity score between each annotation and one or more dictionary words.

18. The computer-implemented method of claim 13, wherein the step of generating a risk event further comprises assessing litigation risk by identifying party and party type and performing conclusion analysis based on a pre-trained conclusion identifier model.

19. The computer-implemented method of claim 13, wherein the step of generating a risk score further comprises determining article-entity relevance, article-section relevance and risk relevance.

20. The computer-implemented method of claim 13, wherein the step of extracting one or more relevant texts from the article corpus further comprises identifying an entity using a name entity recognition (NER) technique.

21. The computer-implemented method of claim 13, wherein the step of clustering a set of articles is based on density based spatial clustering to identify similar types of events within a predetermined time frame.

22. The computer-implemented method of claim 13, wherein the determined sentiment is further validated against one or more negative events using a dependency parsing technique.

23. The computer-implemented method of claim 13, wherein the weights and the plurality of filters are configurable by a user.

* * * * *